United States Patent
Sato

(10) Patent No.: US 8,331,363 B2
(45) Date of Patent: Dec. 11, 2012

(54) METHOD FOR COMMUNICATION, COMMUNICATION TERMINAL, DATA FORWARDING UNIT, AND CONTROLLER

(75) Inventor: Izuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 12/764,372

(22) Filed: Apr. 21, 2010

(65) Prior Publication Data

US 2010/0202458 A1    Aug. 12, 2010

Related U.S. Application Data

(63) Continuation of application No. PCT/JP2007/071216, filed on Oct. 31, 2007.

(51) Int. Cl.
*H04L 12/28* (2006.01)
(52) U.S. Cl. ......................... 370/389; 370/390
(58) Field of Classification Search .................. None
See application file for complete search history.

(56) References Cited

U.S. PATENT DOCUMENTS

| | | | | |
|---|---|---|---|---|
| 5,131,016 | A | * | 7/1992 | Broughton et al. ........... 375/240 |
| 5,535,199 | A | * | 7/1996 | Amri et al. .................... 370/392 |
| 6,434,133 | B1 | | 8/2002 | Hamalainen |
| 2002/0031149 | A1 | | 3/2002 | Hata et al. |
| 2005/0169270 | A1 | * | 8/2005 | Mutou et al. ................. 370/390 |
| 2009/0109924 | A1 | * | 4/2009 | Sato ............................. 370/331 |
| 2010/0202458 | A1 | * | 8/2010 | Sato ............................. 370/392 |

FOREIGN PATENT DOCUMENTS

| | | |
|---|---|---|
| CN | 1278383 A | 12/2000 |
| JP | 2001-237891 | 8/2001 |
| JP | 2002-158739 | 5/2002 |
| JP | 2003-224610 | 8/2003 |
| JP | 2004-194232 | 7/2004 |

OTHER PUBLICATIONS

First notification from The State Intellectual Property Office of China for corresponding Chinese Application 200780101398.6, issued Jan. 31, 2012.
International Search Report for corresponding International Patent Application No. PCT/JP2007/071216, mailed Nov. 27, 2007.

(Continued)

*Primary Examiner* — Robert Wilson
(74) *Attorney, Agent, or Firm* — Myers Wolin, LLC

(57) ABSTRACT

A first communication terminal attaches information to be used to recognize whether or not header decompression processing is required and to recognize a forwarding route to a second communication terminal, to compressed data obtained through compressing a header of original data destined for the second communication terminal, and sends the compressed data to the network. Upon receipt of the compressed data, a data forwarding unit in a network recognizes, based on the information, whether or not the compressed data requires the header decompression processing and the forwarding route, and sends, if the compressed data does not require the header decompression process, the compressed data to the recognized forwarding route without decompressing the header.

12 Claims, 23 Drawing Sheets

OTHER PUBLICATIONS

3GPP TR 23.882 V1.11.0 (Jul. 2007); 3rd Generation Partnership Project; Technical Specification Group Services and System Aspects; "3GPP System Architecture Evolution: Report on Technical Options and Conclusions"; (Release 7); Global System for Mobile Communications; Issued Sep. 9, 2007.

3GPP TR 23.882 V1.10.0 (May 2007); 3rd Generation Partnership Project; Technical Specification Group Services and System Aspects; "3GPP System Architecture Evolution: Report on Technical Options and Conclusions"; (Release 7); Global System for Mobile Communications; Issued Jun. 25-29, 2007.

3GPP TS 23.401 V1.0.0 (May 2007); 3rd Generation Partnership Project; Technical Specification Group Services and System Aspects; "GPRS enhancements for E-UTRAN access"; (Release 8); Global Systems for Mobile Communications; Issued Jun. 13, 2007.

3GPP TS 36.300 V1.0.0 (Mar. 2007); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2 (Release 8); Issued Mar. 19, 2007.

3GPP TS 23.228 V8.1.0 (Jun. 2007); 3rd Generation Partnership Project; Technical Specification Group Services and System Aspects; "IP Multimedia Subsystem (IMS)"; Stage 2 (Release 8); Issued Jun. 19, 2007.

3GPP TS 29.060 V7.5.1 (Mar. 2007); 3rd Generation Partnership Project; Technical Specification Group Core Network and Terminals; "General Packet Radio Service (GPRS); GPRS Tunnelling Protocol (GTP) across the Gn and Gp interface"; (Release 7); Issued Mar. 23, 2007.

3GPP TS 25.323 V7.4.0 (Mar. 2007); 3rd Generation Partnership Project; Technical Specification Group Radio Access Network; Packet Data Convergence Protocol (PDCP) specification (Release 7); Issued Jun. 4, 2007.

Bormann et al.; Network Working Group; Request for Comments: 3095; Category: Standards Track; "RObust Header Compression (ROHC): Framework and four profiles: RTP, UDP, ESP, and Uncompressed Status of this Memo"; Issued Jul. 2001.

* cited by examiner

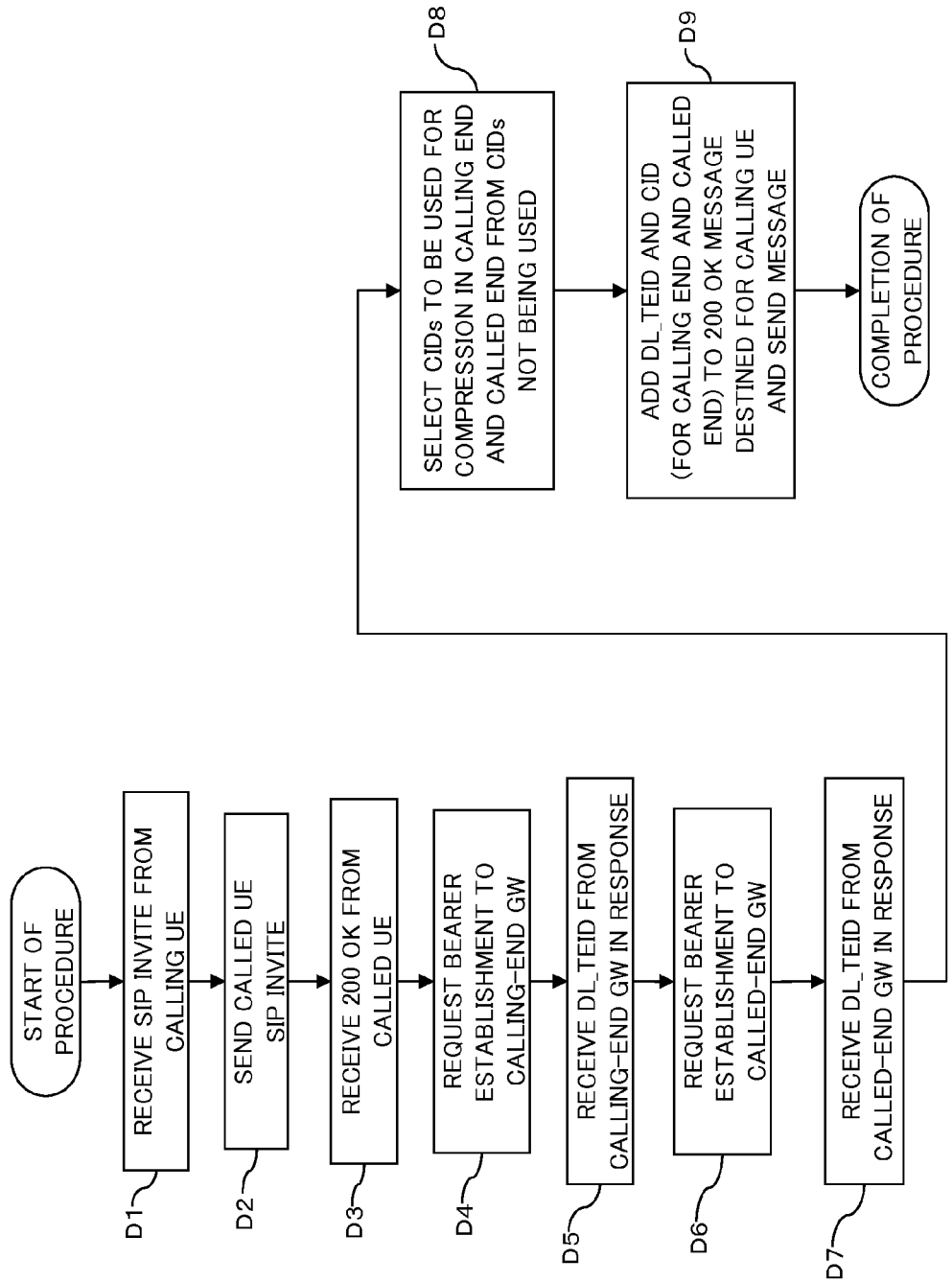

US 8,331,363 B2

METHOD FOR COMMUNICATION, COMMUNICATION TERMINAL, DATA FORWARDING UNIT, AND CONTROLLER

CROSS-REFERENCE TO RELATED APPLICATION

This application is a continuation Application of a PCT international application No. PCT/JP2007/071216 filed on Oct. 31, 2007, in Japan, the entire contents of which are incorporated by reference.

FIELD

The present invention relates to a method for communication, a communication terminal, a data forwarding unit, and a controller. The present invention is preferably applied to a communication system in which, for example, the transmission end compresses part (header) of data (packet) and sends the compressed data and the reception end decompresses the compressed header.

BACKGROUND

The Patent Literature 1 (Japanese Patent Application Laid-Open (KOKAI) publication No. 2003-224610) discloses a technique of a system of and a method for forwarding packet having a compressed header.

This technique forwards information whose header is compressed without decompressing/compressing of the header information during the packet forwarding with the intentions of eliminating the requirement of decompression/compression processing and of increasing the efficiency of the use of the lines.

For the above, in Patent Literature 1, upon receipt of a request for connection from a mobile terminal, the gateway node stores information of the mobile terminal and information of the route to another terminal of the destination of sending the request in association with each other on the basis of the connection request, and after that, forwards header-compressed packets to the terminal of the destination of sending the request on the basis of the stored information.

The following Non Patent Literatures 1-7 can be listed as references related to technology of packet communication.

[Patent Literature 1] Japanese Patent Application Laid-Open (KOKAI) publication No. 2003-224610

[Non Patent Literature 1] 3GPP TR 23.882 V1.10.0, [online], Sep. 27, 2007, [search day: Oct. 25, 2007], through Internet

[Non Patent Literature 2] 3GPP TS 23.401 V1.0.0, [online], Jun. 13, 2007, [search day: Oct. 25, 2007], through Internet

[Non Patent Literature 3] 3GPP TS 36.300 V1.0.0, [online], Mar. 19, 2007, [search day: Oct. 25, 2007], through Internet

[Non Patent Literature 4] 3GPP TS 23.228 V8.1.0, [online], Jun. 19, 2007, [search day: Oct. 25, 2007], through Internet

[Non Patent Literature 5] 3GPP TS 29.060 V7.5.1, [online], Mar. 23, 2007, [search day: Oct. 25, 2007], through Internet

[Non Patent Literature 6] 3GPP TS 25.323 V7.4.0, [online], Apr. 6, 2007, [search day: Oct. 25, 2007], through Internet

[Non Patent Literature 7] IETF RFC 3095, [online], July, 2001, [search day: Oct. 25, 2007], through Internet

SUMMARY (1) According to an aspect of the embodiment, a method for communication between a first communication terminal and a second communication terminal, the method including compressing a header of a first packet associated with data being sent to the second communication terminal by the first communication terminal, and attaching information to be used to recognize whether or not header decompression processing is required and to recognize a forwarding route to the second communication terminal to a compressed first packet whose header is compressed; generating a second packet storing the compressed first packet by the first communication terminal, and sending the second packet to a network; upon receiving the second packet from the first communication terminal by a data forwarding unit that is one of the units constituting the network, extracting the compressed first packet from the second packet by terminating the second packet, and recognizing, based on the information attached to the compressed first packet, whether or not the compressed first packet requires the header decompression processing and the forwarding route and sending, if the compressed first packet does not require the header decompression process, the compressed first packet to the recognized forwarding route without decompressing the header of the first packet.

(2) According to an aspect of the embodiment, a communication terminal including an attaching unit which compresses a header of a first packet associated with data being sent to an another second communication terminal, and attaches information used to recognize whether or not header decompression processing is required and to recognize a forwarding route to the second communication terminal to a compressed first packet whose header is compressed; and a sender which generates a second packet storing the compressed first packet, and sends the second packet having the attached information to a network.

(3) According to an aspect of the embodiment, data forwarding unit including: a receiver which receives, from a first communication terminal, a second packet storing a compressed first packet to which information used to recognize whether or not header decompression processing is required and to recognize a forwarding route to a second communication terminal is attached by the first communication terminal, the compressed first packet being a compressed packet whose header of a first packet associated with data being sent to the second communication terminal is compressed by the first communication terminal; a recognizer which extracts the compressed first packet from the second packet by terminating the second packet, and recognizes, based on the information attached to the compressed first packet, whether or not the compressed first packet requires the header decompression processing and recognizes the forwarding route; and a sender which sends, if the compressed first packet does not require the header decompression processing, the compressed first packet to the recognized forwarding route without decompressing the header of the first packet.

(4) According to an aspect of the embodiment, a controller including: a generator which creates information which is to be attached to a compressed first packet and which is to be used to recognize whether or not the compressed first packet requires the header decompression processing and recognize a forwarding route to a second communication terminal, the compressed first packet, being a compressed packet whose header of a first packet associated with data being sent to the second communication terminal is compressed by a first communication terminal, being stored in a second packet generated by the first communication terminal, and being sent to the second communication terminal from the first communication terminal; and a notifier which notifies the information created by the generator to the first communication terminal while a communication path for the communication is being set.

BRIEF DESCRIPTION OF DRAWINGS

[FIG. 23] A flow diagram illustrating operation at the start of connection of the IMS server of FIG. 22.

DESCRIPTION OF EMBODIMENT

Hereinafter, exemplary embodiment will be described with reference to accompanying drawings. The following exemplary embodiment is merely an example and does not intend to exclude various modifications and variations to the proposed method and/or apparatus that are not specifically described herein. Rather, various modifications or variations may be made to the embodiment without departing from the scope and spirit of the proposed method and/or apparatus.

(1) Technique of the Present Embodiment:
(1.1) Bearer Configuration of 3GPP SAE/LTE 3GPP examines a next-generation system (Release 8) capable of accommodating various already-existing radio access schemes (access networks) and of making the core network into a complete IP network (ALL IP), which is detailed in above Non-Patent Literatures 1 (3GPP TR 23.882 V1.10.0) and 2 (3GPP TS 23.401 V1.0.0). The next-generation architecture being here examined is called Systems Architecture Evolution (SAE). The radio communication in SAE is called Long Term Evolution (LTE).

Figure 1:
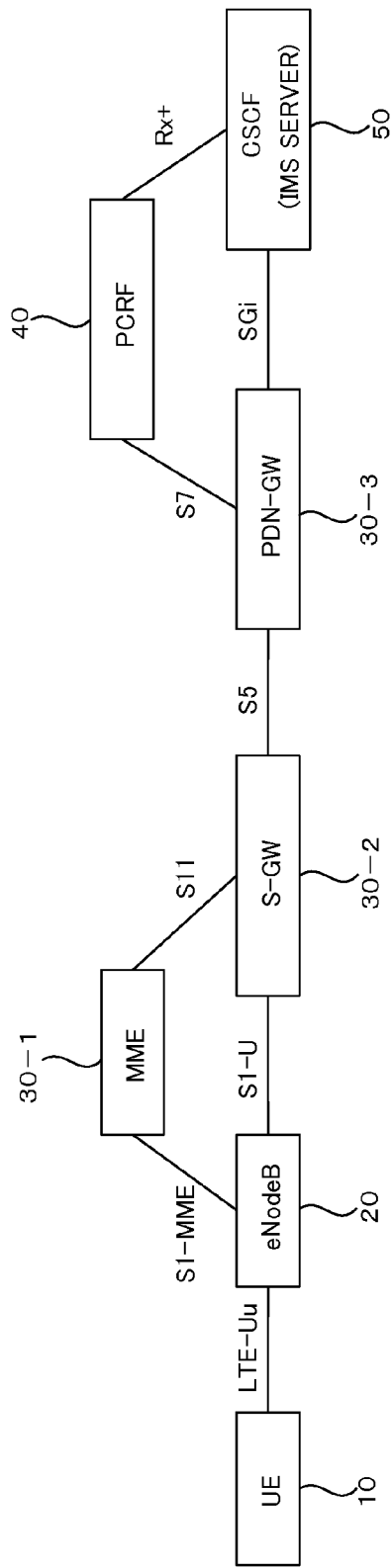
[FIG. 1] A diagram illustrating an example of the configuration of an SAE (Systems Architecture Evolution) system according to a first embodiment of the present invention.

FIG. 1 illustrates an example of the configuration of an SAE system. As depicted in FIG. 1, the SAE includes, for example, user equipment (UE) 10, an eNodeB (eNB) 20 serving as a radio station, an MME (Mobility Management Entity) 30-1, an S-GW (Serving Gateway) 30-2, a PDN-GW 30-3, a PCRF (Policy and Charging Rules Function) 40, and a CSCF (Call Session Control Function) 50.

The UE 10 includes a radio interface, and, when being in the service area of an eNB 20, is connected to the eNB 20 through a radio link to communicate with another UE 10, servers, and other unit via the same eNB 20. The radio link includes a downlink (DL) and an uplink (UL), respectively represent the direction of from the UE 10 to the eNB 20 and the reverse direction of that of the UL. The UE 10 is exemplified by a mobile phone, a PDA, and a notebook PC. The UE 10 may be a communication terminal connected to the eNB 20 through the wire interface.

The eNB 20 is an entity (node) that terminates the radio communication with the UE 10. The eNB 20 receives radio packets from the UE 10, and sends the UE 10 radio packets destined for the UE 10. The eNB 20 corresponds to an entity having a function of combination between the base station (BS) and partial functions of the RNC (Radio Network Controller) in a UTRAN (Universal Terrestrial Radio Access Network).

The MME 30-1 is an entity (logical node) that manages the position (mobility) of the UE 10 and bearers, and carries out NAS (Non-Access-Stratum) signaling.

The S-GW 30-2 is an entity functioning as an interface with an E-UTRAN (Evolved Universal Terrestrial Radio Access Network) that is a radio access network of the next-generation architecture, and sends and receives user packets with the eNBs 20 in the E-UTRAN. Here, the S-GW 30-2 approximately corresponds to an entity called an SGSN (Serving GPRS Support Node) in a GPRS (General Packet Radio Service). E-UTRAN is described in above Non-Patent Literature 3 (3GPP TS 36.300 V1.0.0).

The PDN-GW 30-3 is a gateway node that terminates the interface to the PDN (Packet Data Network). The PDN may be Internet, a network in an operator, a private packet data network, and a packet data network (for providing IMS service) between operators. The PDN-GW 30-3 approximately corresponds to an entity called a GGSN (Gateway GPRS Support Node) in a GPRS. The IMS (IP Multimedia Subsystem) is defined in the above Non-Patent Literature 4 (3GPP TS 23.228 V8.1.0).

The PCRF 40 is an entity (a logical node) that manages and controls policies and charges, such as QoS (Quality of Service) of a bearer, in responsive to requests from the CSCF 50.

The CSCF 50 is an entity (a logical node) that manages and controls sessions of the IMS. However, the CSCF 50 does not directly control the PDN-GW 30-3, but does set (establish)

the bearers through the PCRF 40. The CSCF 50 is realized as, for example, one of the functions of an application server, such as an IMS server, that constitutes the PDN.

As illustrated in FIG. 1, the interface between the UE 10 and the eNB 20 is represented as "LTE-Uu"; that between the eNB 20 and the MME 30-1 is represented as "S1-MME"; and that between the eNB 20 and the S-GW 30-2 is represented as "S1-U".

Furthermore, the interface between the S-GW 30-2 and the PDN-GW 30-3 is represented as "S5"; that between the PDN-GW 30-3 and the PCRF 40 is represented as "S7"; that from the PDN-GW 30-3 to the PDN (CSCF 50) is represented as "SGi"; and that between the CSCF 50 and the PCRF 40 is represented as "Rx+".

The bearer (SAE bearer) of the SAE is defined in a section from the UE 10 to the communication unit (PDN-GW 30-3) in the PDN. A data forwarding route having a defined communication destination, a defined QoS and the like, is called "bearer".

Figure 2:
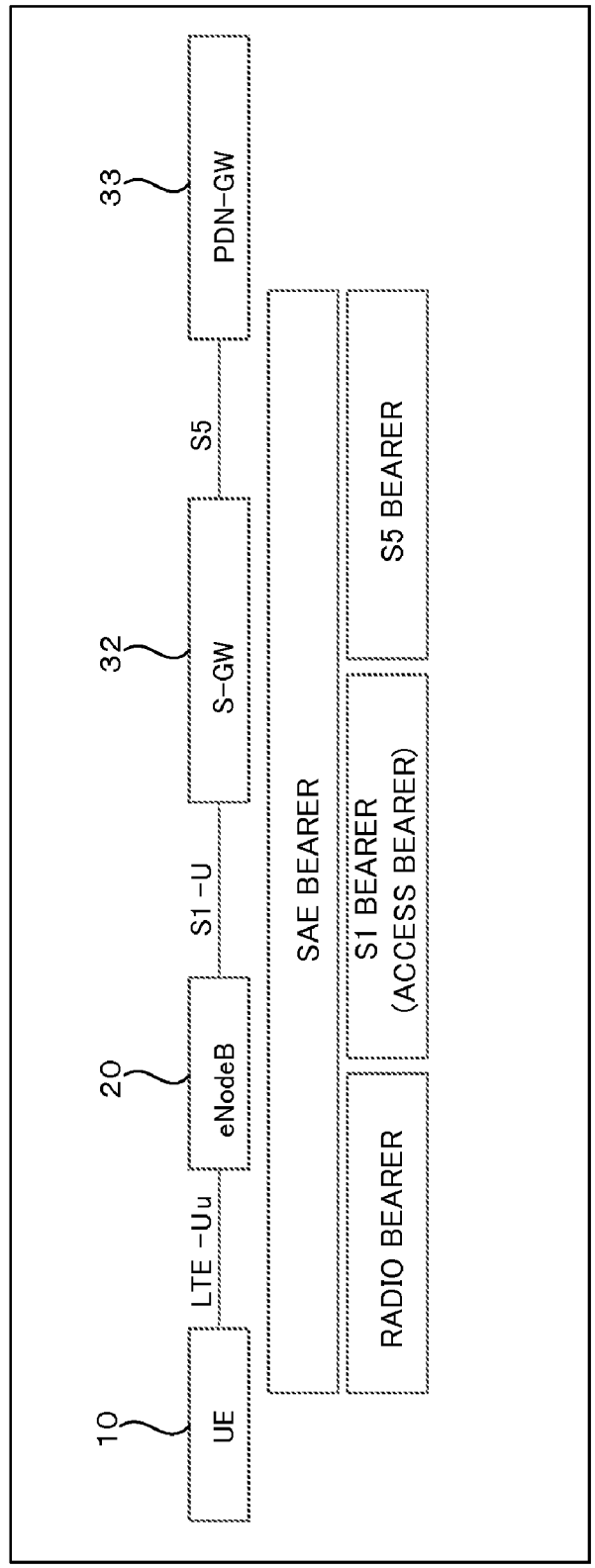
[FIG. 2] A diagram illustrating the configuration of an SAE bearer.

As illustrated in FIG. 2, for example, bearers of Radio bearer, S1 bearer and S5 bearer are defined respectively for the routes between the UE 10 and the eNB 20, between the eNB 20 and the S-GW 30-2, and between the S-GW 30-2 and the PDN-GW 30-3 correspondingly to the names of the interfaces. These interfaces use respective different combinations of protocols.

For example, data that is to be sent on the Radio bearer is sent through the use of the combination of the radio protocol and an upper data forwarding protocol. This bearer is identified by a Radio bearer identifier (RBID).

The S1 bearer can use the GPRS (General Packet Radio Service) tunneling protocol (GTP) for data forwarding. The GTP is defined in the above Non-Patent Literature 5 (3GPP TS 29.060 V7.5.1). A TEID (Tunnel Endpoint Identifier) that identifies the endpoint of reception via the GTP can be used as a bearer identifier. TEID is described in chapter 6 of the Non-Patent Literature 5. The S5 bearer can also be identified by TEID.

As illustrated in FIG. 2, a single Radio bearer, a single S1 bearer and a single S5 bearer are used for each individual SAE bearer, and each node (entity) associates the corresponding bearers with the SAE bearer in a one-to-one relationship.

Accordingly, when the eNB 20 receives a packet from the S-GW 30-2 and sends the same packet to the radio link, the eNB 20 refers to the TEID of the received packet and thereby grasps which RBID is attached to the received packet on the basis of the association denoted in FIG. 2 using the TEID as a key.

Establishment of an SAE bearer requires establishment of the bearers of the respective interfaces. The bearer establishment may be initiated from the UE 10 or from an entity on the network. In the latter case, the bearer is established in the following procedure when the bearer establishment is required for voice communication (VoIP service) or the like between the UEs 10.

(1) A calling UE 10-1 sends the IMS server (CSCF) 50 an SIP (Session Initiation Protocol) message (INVITE) that requests establishment of the bearer. The INVITE message includes information (IP address) that specifies a destination UE 10-2.

(2) The IMS server 50 sends an SIP message (INVITE) to the destination UE 10-2 on the basis of the IP address.

(3) Upon receipt of the SIP (INVITE) message, the UE 10-2 sends, if accepting (responding) the request, the response message (200 OK) indicating the acceptance to the IMS server 50.

(4) Upon receipt of the acceptance from the UE 10-2, the IMS server 50 establishes a bearer between the UE 10-1 and the UE 10-2, and notifies the UE 10-1 and the UE 10-2 of completion of the preparation.

Figure 3:
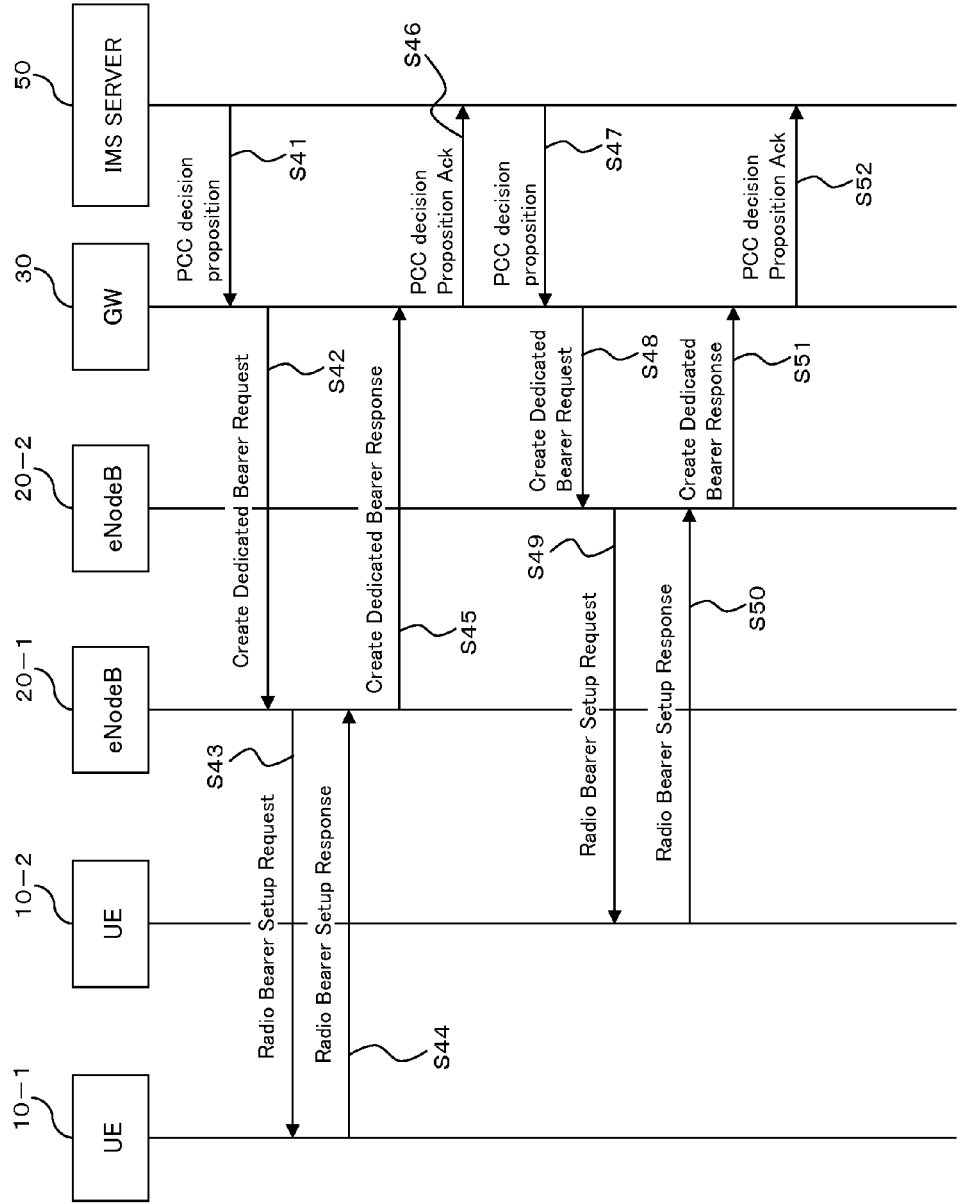
[FIG. 3] A diagram illustrating a signaling sequence in bearer establishment processing.

Here, referring to FIG. 3, the establishment of the bearer between the UE 10-1 and the UE 10-2 is accomplished by sending a message to request the bearer establishment from the IMS server 50 to the UE 10-1 through, in sequence, the PCRF 40, the GW 30 (the PDN-GW 30-3, the S-GW 30-2, the MME 30-1) and the eNB20-1 and to the UE 10-2 through, in sequence, the PCRF 40, the GW 30 (the PDN-GW 30-3, the S-GW 30-2, the MME 30-1) and the eNB20-2 (steps S41 to S43, and S48 to S50), and sending the messages responsive to the request to the IMS server from the UE 10-1 to the IMS server 50 through, in sequence, the eNB 20-1 and the GW 30 and from the UE 10-2 to the IMS server 50 through, in sequence, the eNB 20-2 and the GW 30 (steps S44 to S47, and S51 to S52).

In the example of FIG. 3, Policy and Charging Control (PCC) decision proposition, Create Dedicated Bearer Request, and Radio Bearer Setup Response are sent as messages to request bearer establishment, and in response to these messages, Radio Bearer Setup Response, Create Dedicated Bearer Response, and PCC decision proposition ACKnowledgement are respectively sent.

It should noted that the example of FIG. 3 collectively calls entities of the MME 30-1, the S-GW 30-2, and the PDN-GW 30-3 the GW 30 (and so forth), and omits illustration of the PCRF 40. In FIG. 3, the eNB 20-1 is an eNB that the calling UE 10-1 connects, and the eNB 20-2 is an eNB that the destination (called) UE 10-2 connects. The term "connecting" means a state in which the bearer is established.

Hereinafter, if there is no need to discriminate the UE 10-1 and the UE 10-2 from each other, both are simply represented by "UE 10". Similarly, if there is no need to discriminate the eNB 20-1 and the eNB 20-2 from each other, both are simply represented by "eNB 20". The eNB 20-1 connected to the calling UE 10-1 and the eNB 20-2 connected to the called UE 10-2 are sometimes called the "calling-end eNB 20-1" and the "called-end eNB 20-2", respectively. Focusing on the communication in the reverse direction, the calling end and the called end are opposite to the above.

The entities except for the UEs 10 and the CSCF (IMS server) 50 can be regarded as entities that constitute a network including part or the entire of the radio access network and the core network. The eNBs 20 and the GW 30 can be regarded as data (packet) forwarding unit that forwards the data (packets) in the network. The IMS server 50 can be regarded as a controller that manages and controls communication (sessions, bearers) in the network.

(1.2) Technique of Header Compression:

In a mobile telephone networks, it is important to effectively use resources between radio sections. For this purpose, a technique of header compression called "ROHCOLE_LINK1 (RObust Header Compression) OLE_LINK1" is effectively used for packet communication between the UE 10 and the eNB 20.

Figure 4:
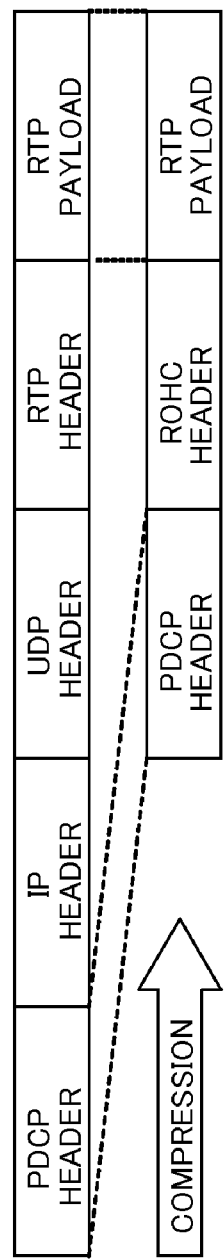
[FIG. 4] A diagram illustrating header compression of the ROHC (RObust Header Compression) according to the first embodiment of the present invention.

ROHC dynamically compresses the header of user data (IP packet) accommodated in the payload of the PDCP (Packet Data Convergence Protocol) packet. For example, assuming that the user data is an RTP (Real Time Protocol) packet, the IP header, the UDP (User Datagram Protocol) header, and the RTP header are compressed as illustrated in FIG. 4. FIG. 4 illustrates replacement of the RTP/UDP/IP headers to the ROHC header by the ROHC.

PDCP is defined in the above Non-Patent Reference 6 (3GPP TS 25.323 V7.4.0), and header compression is described in chapter 5.1 in the same Reference 6. ROHC is defined in the above Non-Patent Reference 7 (IETF RFC 3095).

The protocol of ROHC defines an identifier called Context IDentifier (CID), so that a single communication path can manage a number of flows.

Figure 5:
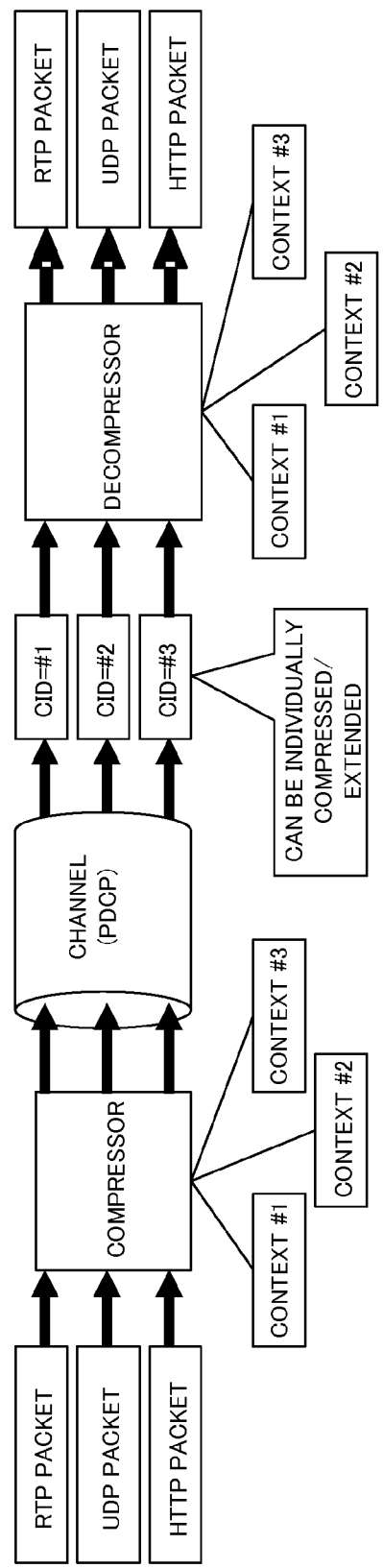
[FIG. 5] A diagram illustrating the concept of the ROHC.

FIG. 5 illustrates a conceptual diagram of ROHC. As illustrated in FIG. 5, an end (compression end) that compresses a packet header and sends the compressed packet manages flow (destination of packets), the field value in the packet header and others, using data, called context, related to compression in an internal state. A receiving end (decompression end) similarly manages context.

The transmission end (compression end) allocates CID for each context, attached to the allocated CID to the packet (hereinafter also called a compressed packet or an ROHC packet) whose header is compressed, and sends the packet. The reception-end (decompression end) can recognize which context is to be used for the decompression process on the basis of the CID attached to the compressed packet received.

(2) First Embodiment:

(2.1) Concept of the Entire Operation:

In the embodiment to be detailed below, when the UE 10-1 and the UE 10-2 are to make communication (e.g., VoIP communication) therebetween, the SAE makes it possible to carry out the operation (packet forwarding) of FIG. 6. Here, the embodiment assumes the UE 10-1 (first communication terminal) and the UE 10-2 (second communication terminal) respectively to be the calling end and the called end.

(1) When sending a compressed packet (ROHC packet) of a flow that omits (bypasses) decompression and compression processing in an entity (hereinafter also called a network entity), such as the eNB 20 and the GW 30, the calling UE 10-1 attaches information (a bypass identifier: first information piece) expressing that there is no need (omittable) of decompression processing for the compressed packet, and sends the packet (see symbol B in FIG. 6).

Preferably, a CID in a predetermined range among a number of available CIDs is set as the bypass identifier as detailed below. That eliminates the requirement of using an identifier different from the CIDs. The setting is preferably performed so as to avoid the redundancy between flows to be forwarded between the network entities (the eNB20, the GW30).

The CID serving as a bypass identifier can be allocated (designated) by the network entity (e.g., the IMS server 50). The timing of the allocation is satisfactory at least before the UE 10-1 starts sending of the compressed packet.

Preferably, for example, the IMS server 50 instructs the UE 10-1 of the allocation (see symbol A in FIG. 6) while the IMS server 50 carries out process of bearer establishment after the start of connection by an application (such as a communication application of VoIP) of the UE 10-1. The instruction is preferably provided via a message used in the bearer establishment processing, so that the number of messages, an amount of processing and time until the start of communication do not increase.

(2) The network entity (the eNB 20-1) that calling UE 10-1 connects to judges whether or not header decompression processing is required through judging whether the CID of the compressed packet received from the UE 10-1 is a particular CID (the bypass identifier). The term "connecting" represents a state in which the bearer is established.

Figure 6:
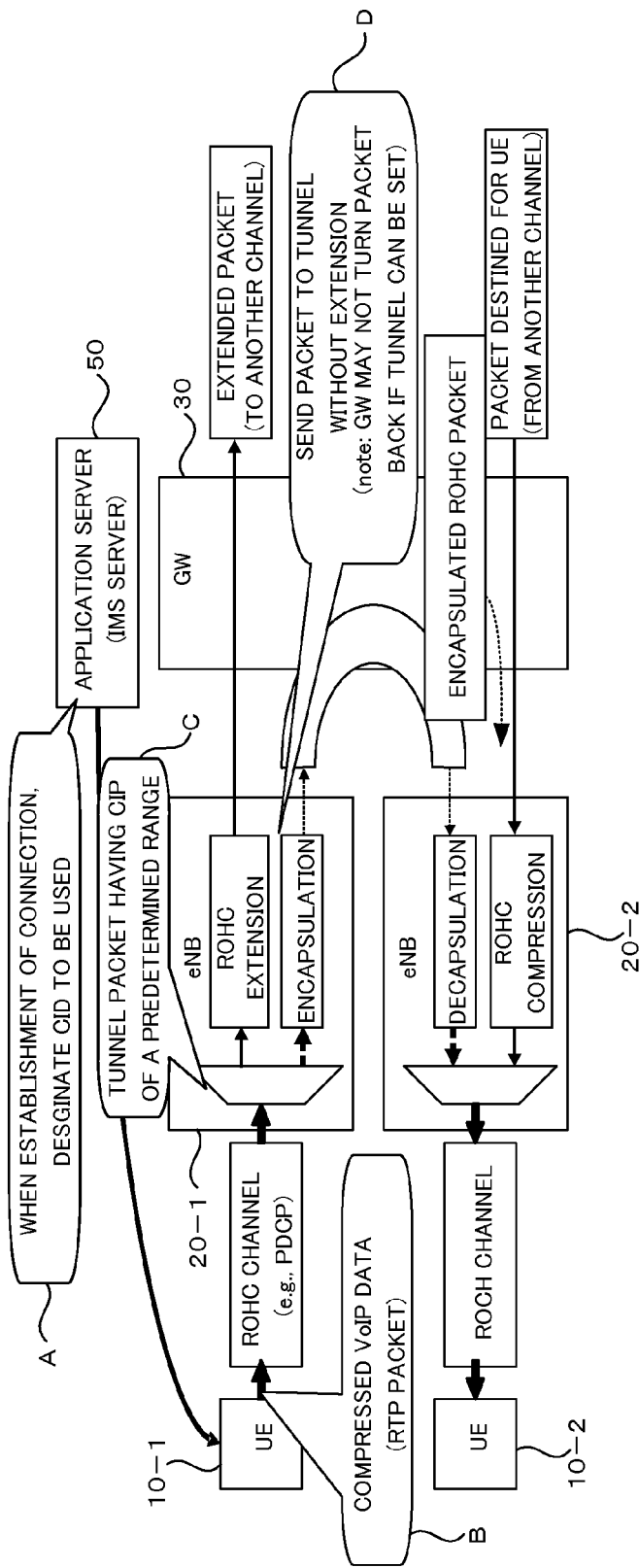
[FIG. 6] A diagram illustrating packet forwarding in the first embodiment of the present invention.

As the result of the judgment, if the header decompression processing is not required, the network entity (the eNB 20-1) encapsulates (attaches a GTP header for tunneling to) the compressed packet without decompressing the header thereof, and forwards (tunnels) the encapsulated packet to the network entity (the eNB 20-2) that the destination UE 10-2 connects (see symbols C and D in FIG. 6). FIG. 6 illustrates that the GW 30 turns the packet (hereinafter called tunnel packet) to be sent to the tunnel route back to the UE 10-2. However, if a tunnel route can be set, such turning back is not required.

Preferably, information with which the network entity (the eNB 20-2) can specify (recognize) the destination UE 10-2 is attached to the tunnel packet, so that the network entity (eNB 20-2), when receiving the tunnel packet, can specify the destination UE 10-2 without making an inquiry to another unit. For example, the information to be attached can be the RBID that recognizes the radio bearer of the DL to the destination UE 10-2 from the eNB 20-2 or information (TEID of DL) associated with the RBID.

(3) Upon receipt of the tunnel packet, the network entity (the eNB 20-2) decapsulates the received packet (through removing the GTP header) to extract the compressed data, which is then sent to the destination UE 10-2.

If the UE 10-2 does not support the ROHC protocol, the eNB 20-1 decompresses the compressed packet and the decompressed IP packet is then sent to the UE 10-2 as the definition of 3GPP.

Figure 7:
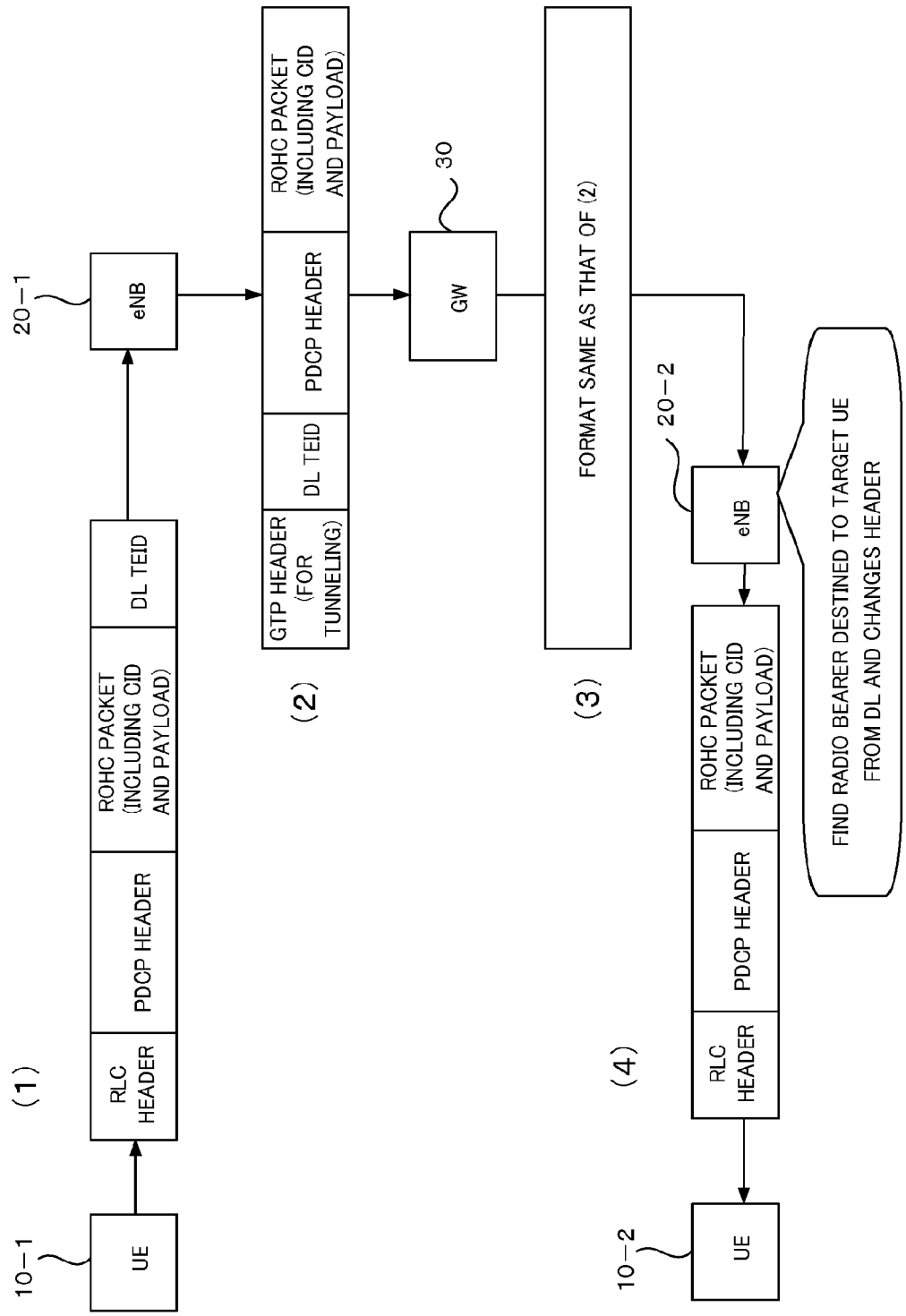
[FIG. 7] A diagram illustrating an example of the packet format used in the first embodiment.

While a packet arrives at the destination UE 10-2 from the calling UE 10-1 (during packet sending process), the first embodiment uses a number of packet formats as exemplified in FIG. 7.

Specifically, when the UE 10-1 sends a packet to the UE 10-2 supporting the ROHC protocol, the ROHC processing stack compresses the packet header according to the ROHC protocol. At that time, the CID is used which is designated as an example of the bypass identifier by the network end (the IMS server 50) at the start of connection.

Then the UE 10-1 attaches the TEID (second information piece) allocated to the S1 interface of the eNB 20-2 that the UE 10-2 connects to the compressed packet (an ROHC packet including the CID). The TEID is dedicated to the downlink (DL) in the direction of from the eNB 20-2 to the UE 10-2, and is consequently denoted as "DL TEID" in FIG. 7.

As illustrated in (1) of FIG. 7, the TEID is attached, as the payload of the PDCP packet, to the end of the ROHC packet. Thereby, part beyond the existing packet format among the protocol processing stacks of the eNB 20-1 that receives this packet is within the range of ROHC processing stack.

In other words, the UE 10-1 attaches, to the compressed data, the CID and the TEID, respectively serving as the first and the second information pieces, as information (PDCP payload) to be processed in a layer (PDCP layer) that the ROHC protocol (header decompressing processing) belongs.

The CID and the TEID are previously designated (notified) from the IMS server 50 to the calling UE 10-1. For example, assuming that the destination UE 10-2 supports the ROHC protocol, the IMS server 50 selects the CID from those in a predetermined range and the TEID of the bearer established between the eNB 20-2 that the destination UE 10-2 connects and the GW 30, and sends the UE 10-1 the CID and the TEID selected, which will be detailed below with reference to FIG. 8.

As illustrated in (1) of FIG. 7, the calling UE 10-1 stores the ROHC packet and the TEID into the payload of the PDCP packet through performing processing stacks of the PDCP and RLC, attaches a PDCP header and an RLC (Radio Link Control) header to the packet, and sends the packet to the eNB 20-1.

The eNB 20-1 analyzes the packet (RLC packet) received from the UE 10-1. Specifically, the eNB 20-1 terminates the RLC header and the PDCP header of the received packet through the processing stacks of RLC and PDCP. Then, the PDCP processing stack activates the ROHC processing stack, which then reads the CID included in the terminated ROHC packet.

On the basis of the CID, the eNB 20-1 (the ROHC processing stack) refers to an association table (context data) possessed and managed by the eNB 20-1, and judges whether or not the received packet is one for which the decompression processing should be omitted (bypassed).

When the CID indicates that the decompression processing should be omitted, the ROHC processing stack of the eNB 20-1 refers to the association table (context data) possessed and managed by the eNB 20-1 on the basis of the CID, and specifies the forwarding destination (the GTP tunnel to the eNB 20-2).

Then, the eNB 20-1 reads the TEID from the end of the PDCP payload, rearranges the read TEID in front of the PDCP packet, attaches a header (GTP header) including information representing GTP tunnel destined for the eNB 20-2 (encapsulation), and sends the encapsulated packet to the GW 30 (see (2) in FIG. 7).

In other words, when sending compressed data to a tunnel route, the eNB 20, serving as a data forwarding unit, attaches, to the compressed data, the TEID serving as the second information piece, to be information (GTP payload) to be processed in a lower layer than the layer that the ROHC protocol (header decompression processing) belongs. The reason for the rearrangement of the TEID will be described below.

In the GW 30, the GTP processing stack forwards the GTP packet (tunnel packet) received from the eNB 20-1 to the eNB 20-2 in accordance with the contents of the GTP header (see (3) in FIG. 7). The information about the tunnel route is presumed to be previously registered in the GW 30, which will be detailed below. If there is a route through which a packet can be directly forwarded from the eNB 20-1 to the eNB 20-2, the GTP packet can be directly forwarded from the eNB 20-1 to the eNB 20-2.

The eNB 20-2 carries out the GTP processing stack and thereby decapsulates the GTP packet received from the GW 30 (otherwise directly from the eNB 20-1) to read the TEID and the PDCP packet included, as the GTP payload, in the packet.

The eNB 20-2 carries out the PDCP processing stack to activate the ROHC processing stack, so that an RBID associated with the read TEID is specified with reference to the association table possessed and managed by the eNB 20-2, creates an RLC packet destined for the UE 10-2 and including the specified RBID in the RLC header through performing the RLC processing stack, and sends the created packet to the UE 10-2 (see (4) in FIG. 7).

The UE 10-2 causes the RLC processing stack to terminate the RLC head of the RLC packet received from the eNB 20-2, and extracts a PDCP packet. Then the PDCP processing stack terminates the PDCP header and extracts an ROHC packet, and decompresses the ROHC packet. The eNB 20-2 passes the restored packet to the application layer of the UE 10-2.

As an alternative to a CID, an identifier of a lower protocol, such as a transmission-end RBID can be used as the bypass identifier. In this case, the calling UE 10-1 is allowed to freely select the CID of the ROHC. However, there is a requirement to ensure that the same CID is not attached when an ROHC compressed packet is sent from destination-end eNB 20-2 to the destination UE 10-2 because of the relation to other flows multiplexed in the bearer. Therefore, the ranges of identifiers of both RBID and CID should be reserved, which burdens inefficiency. For this reason, it is preferable that a CID which is an identifier of an upper layer as described the above is used as the bypass identifier.

In finding (recognizing) the UE 10-2, to which the destination-end eNB 20-2 forwards the received packet, the RBID of the destination UE 10-2 can be used as a substitute for the TEID. This carries the advantage that the packet forwarding can be carried out without using upper bearers than the S1 interface. However, this case requires the eNB 20-2 to carry out different processing from existing processing and also requires change in bearer setup procedure.

In contrast, when the TEID is used as the above, the destination-end eNB 20-2 can discriminate a tunnel packet which is forwarded after being subjected to the decompression processing in the calling-end eNB 20-1 from a non-tunnel packet which is forwarded without being subjected to the decompression processing through the same processing.

Specifically, upon receipt of a packet from the GW 30, the destination-end eNB 20-2 can recognize the bearer to the destination UE 10-2 on the basis of the TEID attached to the received packet irrespective of whether or not the received packet is a tunnel packet, attaches an RBID associated with the recognized bearer to the received packet, and sends the packet to the radio link of the destination UE 10-2. During the above processing, the eNB 20-2 can carry out processing, such as queuing the packet in accordance with the QoS of the bearer, for each individual bearer.

In other words, the use of the TEID makes the eNB 20-2 possible to treat the received packet through the same processing performed as receiving a packet from the S-GW 30-2 through the S1 interface. For this purpose, from the viewpoint of facilitation of the processing performed in the eNB 20-2, the TEID is preferably attached to a tunnel packet.

(2.2) Sequence of Bearer Setup (Establishment):

Next, description will now be made in relation to an example of notifying (designating) a CID and a TEID to be used for the above packet sending process from the network end (the IMS server 50) to the calling UE 10-1.

In this example, when the calling UE 10-1 starts the connection processing to the destination UE 10-2, the CID and the TEID is notified to the calling UE 10-1 through the use of a message that is sent and received between the calling UE 10-1 and the called UE 10-2 (End-to-End) through the IMS server 50 for the bearer establishment processing (bearer setup).

Figure 8:
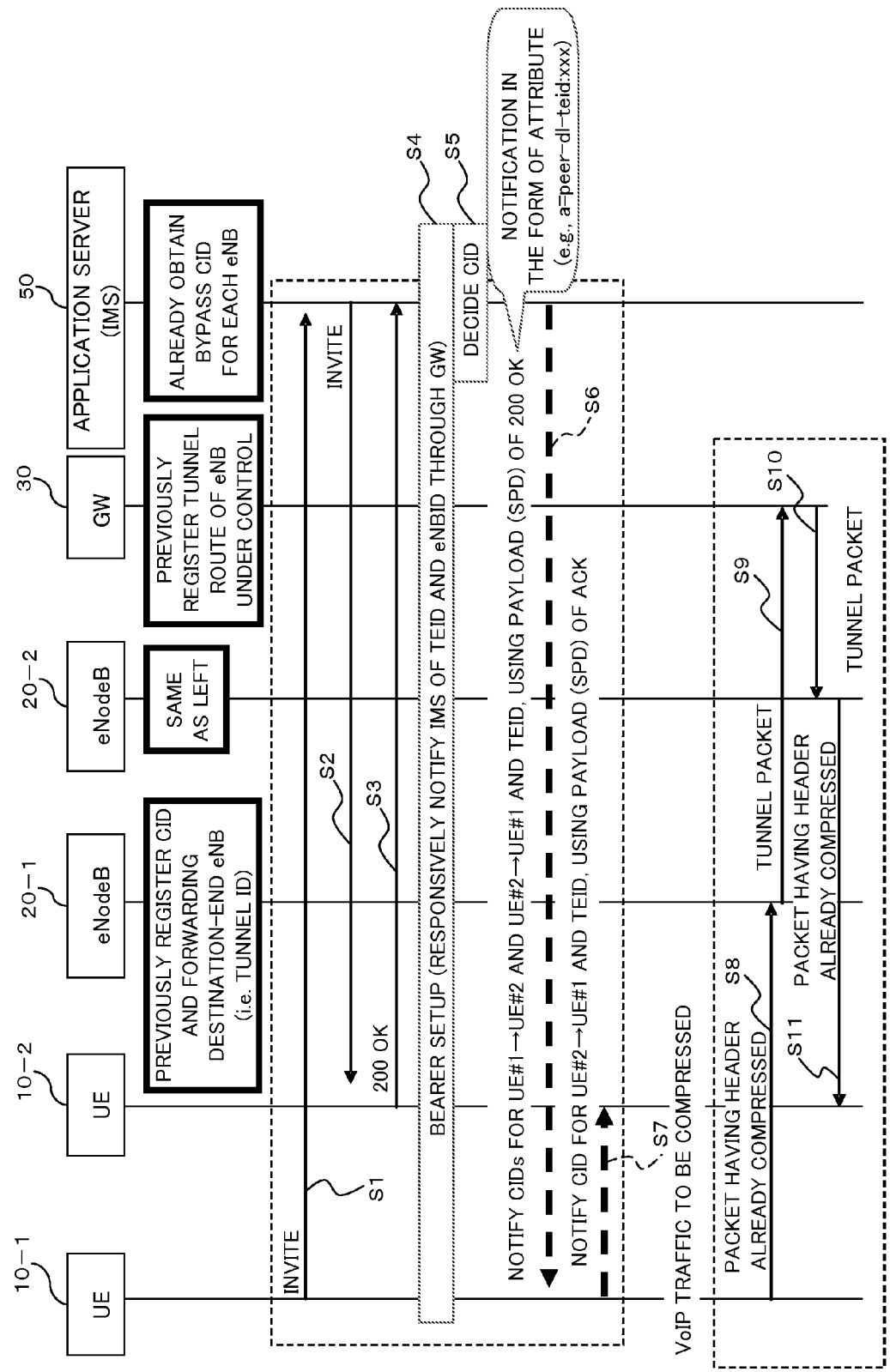
[FIG. 8] A diagram illustrating a communication sequence of the radio communication system of the first embodiment.

For example, as illustrated in FIG. 8, when the UE 10-1 starts the connection to the UE 10-2, the UE 10-1 sends the INVITE message of SIP to the IMS server (CSCF) 50 (step S1).

Upon receipt of the INVITE message, the IMS server 50 sends the INVITE message to the destination UE 10-2 on the basis of the IP address included in the received message (step S2).

The UE 10-2 receives the INVITE message from the IMS server 50, and, if responds to the call from the UE 10-1, replies the IMS server 50 with a response message (200 OK) represents success of the call (step S3). The number "200" is the state code (response code) of the message. Besides, there are codes "100" and "180" respectively representing originating calling (Trying) and ringing processing, whose sequences are however omitted in FIG. 8.

Upon receipt of the response message (200 OK) from the destination UE 10-2, the IMS server 50 carries out the bearer establishment procedure of FIG. 3, and consequently establishes the session (bearer) between the calling UE 10-1 and the called UE 10-2 (step S4).

In this example, the TEID is notified to the IMS server 50 through the use of response messages (ACKnowledgement, Response) sent and received during the bearer establishment processing. This makes the IMS server 50 possible to know the TEID (DL_TEID) of the eNB 20-1 and the eNB 20-2. Further, the eNB 20-1 and the eNB 20-2 notify their own identification information (eNBIDs) to the IMS server 50 through the response messages, so that the IMS server 50 can manage the CID for bypassing the decompression process for each of the eNB 20-1 and the eNB 20-2.

When the bearer establishment completes, the IMS server 50 decides the CIDs each to be used in ROHC by one of the UE 10-1 and the UE 10-2 (step S5). In detail, in cases of bi-directional communication, the CID for the UE 10-1 (in the direction of the UE 10-1 to the UE 10-2) and the CID for the UE 10-2 (in the reverse direction) are decided.

In this case, the CID for the UE 10-1 is selected from a range allocated to the eNB 20-2 that one of the communication pair UE 10-2 connects to and the CID for the UE 10-2 is selected from a range allocated to the eNB 20-1 that the other of the communication pair UE 10-1, which is detailed below.

The IMS server 50 notifies the decided CIDs for the UE 10-1 and the UE 10-2, and the TEID to the calling UE 10-1 via the SIP response message (200 OK) (step S6). The UE 10-1 notifies the CID for the UE 10-2 and the TEID to the destination UE 10-2 via the SIP ACK message (step S7).

These parameters (CIDs, TEID) are notified to the UE 10-1 and the UE 10-2 in the form of being described as an attribute (e.g., a=peer-dl-teid:xxx) in the payload of the SIP message by the SDP (Session Description Protocol).

On the basis of the TEID and CIDs designated as the above, the UE 10-1 and the UE 10-2 start communication through performing the ROHC processing. Namely, focusing on the communication in the direction of from the UE 10-1 to the UE 10-2, the UE 10-1 sends the eNB 20-1 packet subjected to the header compression (hereinafter simply called "compression") by ROHC (step S8). The eNB 20-1 encapsulates the received packet through the use of the TEID without the header decompression (hereinafter simply called "decompression") and tunnels the encapsulated packet to the eNB 20-2 (steps S9 and S10). The eNB 20-2 decapsulates the received tunnel packet and sends the decapsulated packet to the UE 10-2 (step S11).

(2.3) Method of Selecting a CID:

A CID is determined in the following method. Firstly, respective eNBs 20 that performs bypass processing are allocated ranges of CID not overlapping with one another.

For example, in an attempt of performing the bypass processing in an area including 100 eNBs 20, 100 ranges not overlapping can be allocated one to each eNB as exemplified by following Table 1 in which CID=100-199, CID=200-299, and CID=300-399 are respectively allocated to eNB#1, eNB#2, and eNB #3.

TABLE 1

Association (eNB) Between (ranges of) CIDs and eNB

| CID | Forwarding Destination (eNBID) |
|---|---|
| 100-199 | eNB#1 |
| 200-299 | eNB#2 |
| 300-399 | eNB#3 |
| ... | ... |

The IMS server possesses a CID management table (CID management data) as denoted in following Table 2 in which an available range of CIDs for each eNB 20 is previously registered and managed. The IMS server 50 selects a CID (one for each bi-direction communication) not being used from an available CID range for each eNB 20, and notifies the selected CID to the calling UE 10.

TABLE 2

CID Management Table (IMS Server)

| Forwarding Destination (eNBID) | CID |
|---|---|
| eNB#1 | 100-199 |
| eNB#2 | 200-299 |
| eNB#3 | 300-399 |
| ... | ... |

Furthermore, the GW 30 possesses a routing table denoted in following Table 3 in which information (eNBID) of a destination (forwarding destination) eNB 20 is registered and managed for each tunnel route (TEID). The GW 30 recognizes the eNB 20 associated with the TEID of the received packet on the basis of the routing table so that the received packet is encapsulated and tunneled suitably for the forwarding destination-end eNB 20. Namely, even the network is incapable of forwarding a packet directly between the eNBs 20, packets can be appropriately forwarded.

TABLE 3

Routing Table (GW)

| Reception-end Terminal ID(TEID) | Destination eNB(eNBID) | Notes |
|---|---|---|
| 1020 | eNB#2 | eNB#1→eNB#2 forwarding |
| 2010 | eNB#1 | eNB#2→eNB#1 forwarding |
| 1030 | eNB#3 | eNB#1→eNB#3 forwarding |
| 3010 | eNB#1 | eNB#3→eNB#1 forwarding |
| 2030 | eNB#3 | eNB#2→eNB#3 forwarding |
| 3020 | eNB#2 | eNB#3→eNB#2 forwarding |
| ... | ... | ... |

As described above, if there is a route through which packets can be directly forwarded between the eNBs 20, packets can be directly forwarded without passing through the GW 30. Therefore, it is possible to eliminate the requirement for data about such a route capable of direct forwarding.

Under the above circumstance, a case is assumed in which the bidirectional communication (e.g., voice communication via VoIP) between the UE 10-1 and the UE 10-2 is started, that is, transmission and reception of user data (voice data) is started when the UE 10-1 and the UE 10-2 are connected to the eNB 20-1 and the eNB 20-2, respectively (i.e., the bearers are established).

On the basis of the CID management table of above Table 2, the IMS server 50 selects "200", which is not used, as the CID to be attached to a compressed packet by the UE 10-1 among a range of CID allocated to, for example, the called-end eNB 20-2, and selects "100", which is not used, as the CID to be attached to a compressed packet by the UE 10-2 among a range of CID allocated to, for example, the calling-end eNB 20-1.

The IMS server 50 notifies the respective CIDs to the UE 10-1 and the UE 10-2 and causes the UEs to use the CIDs. Consequently, the eNB 20-1 that receives a compressed packet sent from the UE 10-1 can forward a compressed packet having CID=200 to the tunnel route to the eNB 20-2 on the basis of above Table 1. In the same manner, the eNB 20-2 that receives a compressed packet sent from the UE 10-2 can forward a compressed packet having CID=100 to the tunnel route to the eNB 20-1 on the basis of above Table 1.

The system of this example attains the following effects and advantages:

(1) In compressing a packet and sending the compressed packet, the UE 10 can attach, to the packet, information (CID as an example of a bypass identifier) which indicates that the packet is one belonging to a flow not requiring decompression processing.

(2) The eNB 20 can recognize packets that can be sent to the destination UE 10 without performing decompression processing in the network among compressed packets sent from the UE 10 through a communication path.

(3) Since the network entities (the eNB 20, and the GW 30) omit decompression processing and compression processing on compressed packet each to which a particular identifier (CID as an example of the bypass identifier) is attached, it is possible to reduce an amount of processing required to send the packet to the destination (the UE 10) from such network entities.

(4) When compressed packets are forwarded without being decompressed between the network entities, the packets can be multiplexed between the network entity when tunnel forwarding. The identifiers for this propose can be identifiers (CIDs) that the UE 10 attaches. Accordingly, there is no need of network entities to newly create and manage identifiers.

(5) Since the calling UE 10 is notified of the CID serving as an example of a bypass identifier from the IMS server 50 at the start of the communication, the calling UE 10 does not have to negotiate with the network entities (the eNB 20, the GW 30) and the destination UE 10-2, and is only required to attach the notified CID, so an amount of processing required until the start of communication is not increased.

(6) It is sufficient that the network entities (eNB 20, GW 30) only forward (tunnel) received packets in accordance to the CIDs that the calling UE 10-1 attaches to the received packets without decompressing/compressing the received packet, so that there is no requirement of information, such as a conversion table for each connection, dynamically managed.

(7) Since the network entity (called-end eNB 20) that the destination UE 10 connects can recognize the destination UE 10-2 with reference to the TEID attached to the packet, the called-end eNB 20-2 can correctly send the packet forwarded through the tunnel route to the proper destination UE 10 without making an inquiry to another entity.

(8) Since it is sufficient that the calling UE 10 only sets the identifier notified from the network entity (IMS server 50) at the start of the connection to the destination UE 10 in the compression function of the ROHC, the change in header compression/decompression function of the UE 10 can be minimized.

In above Patent Reference 1, the GGSN terminates the ROHC protocol and the gateway node (GGSN) creates the contexts of the reception end and the transmission end in an attempt of reduction in load on the ROHC processing at the GGSN. However, the method of Patent Reference 1 requires the configuration in which the same entity (GGSN) terminates the ROHC protocols of the UL and the DL.

(3) Configuration (Function) and Operation of System Elements:

Next, description will now be made in relation to examples of the detailed configurations (functions) and operation of each entity of the UE 10, the eNB 20, the GW 30, and the IMS server 50 with reference to FIGS. 9 through 23.

Figure 9:
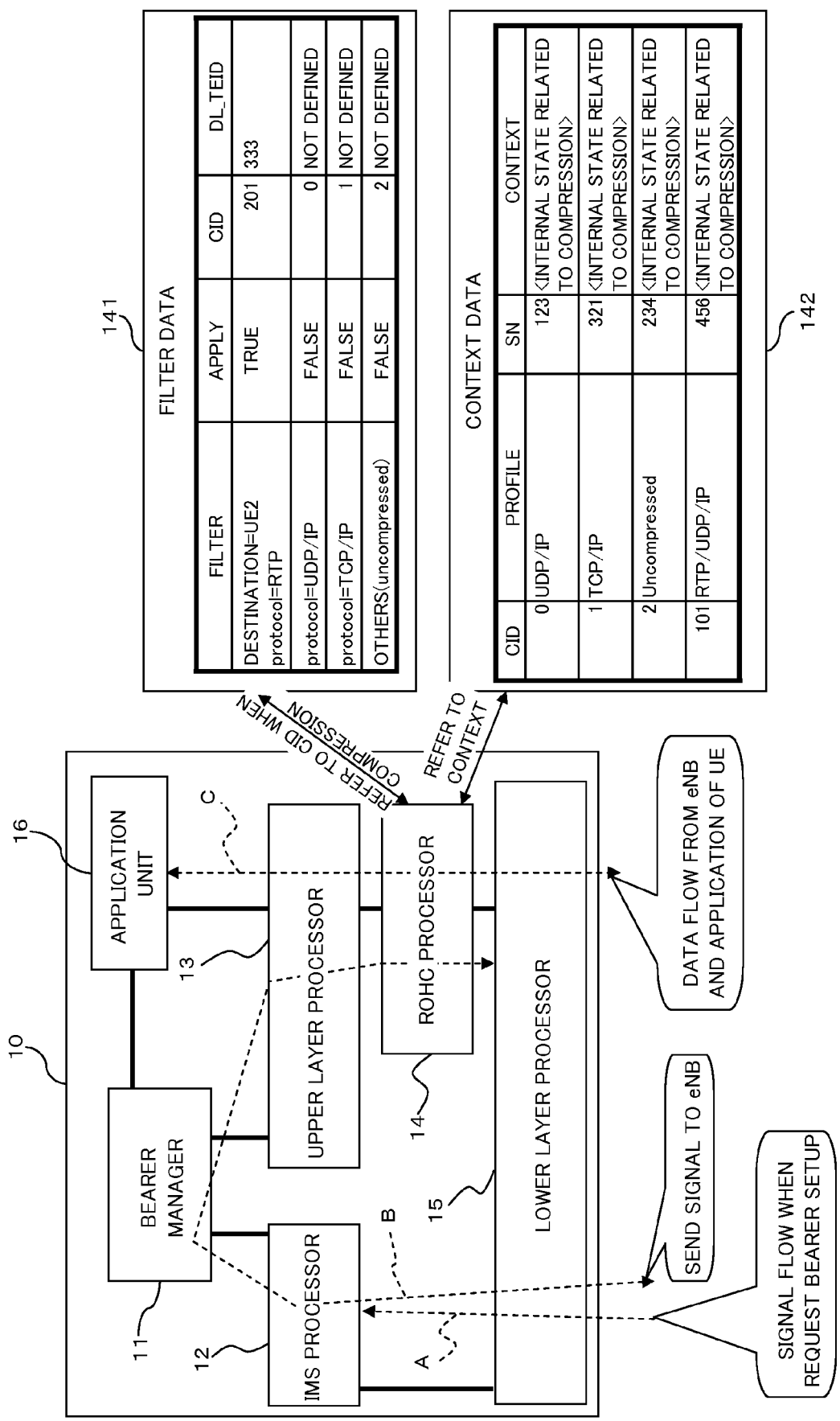
[FIG. 9] A block diagram illustrating the configuration (function) of user equipment (UE) of the first embodiment.

(3.1) Description of the UE:

FIG. 9 is a block diagram illustrating an example of the configuration of the UE 10. The UE 10 of FIG. 9 includes, for example, a bearer manager 11, an IMS processor 12, an upper layer processor 13, an ROHC processor 14, a lower layer processor 15, and an application unit 16.

In FIG. 9, dotted arrows A, B, and C indicate routes (flows) of forwarding signal in the UE 10. Specifically, arrow A represents a signal flow when bearer establishment is requested; arrow B represents a signal flow (sending) to the eNB 20; and arrow C represents a reception data flow from the eNB 20 and the sending data from the application unit 16 of the UE 10.

Namely, the signal flow A indicates that the signal passes through, in sequence, the lower layer processor 15, the IMS processor 12, the bearer manager 11, the upper layer processor 13, the ROHC processor 14, and lower layer processor 15, during which the upper layer processor 13, the ROHC processor 14, and the lower layer processor 15 can be set in accordance with the bearer setting. The signal flow B indicates that a signaling message created by the IMS processor 12 is subjected to predetermined protocol processing in the lower layer processor 15 and then sent to the eNB 20. The data flow C indicates that data passes through the upper layer processor 13, the ROHC processor 14, and the lower layer processor 15, each in which data is subjected to required protocol processing.

Here, the bearer manager 11 has functions of managing bearers (Radio bearers) of the DL and UL between the UE 10 and the eNB 20, and of carrying out, in response to a request from the application unit 16, the bearer establish processing (creation, sending and receiving messages) in cooperation with the IMS processor 12.

The IMS processor 12 has functions of creating messages (e.g., ISP messages, such as INVITE, and 200 OK, messages for bearer setup processing (radio bearer establishment response)) responsive to requests from the bearer manager 11, of sending the created messages to the eNB 20, and receiving messages that the eNB 20 sends.

The upper layer processor 13 has a function (processing stack) of carrying out processing defined by an upper layer than the PDCP (ROHC) layer, for example, a function of processing (terminating or replacing headers) data conforming to various protocols, such as the IP, the UDP, and the RTP (RTCP).

The ROHC processor 14 has functions (ROHC processing stack) of compressing the header of a sending packet and decompressing the header of a received packet via the ROHC protocol, which is regarded as one of the protocol stacks of the PDCP layer. The ROHC processor 14 of this example stores filter data (list) 141 that recognizes the suitability (available/not-available) of the bypass processing and context data 142 that recognizes a context to be used in the compression by the ROHC as illustrated in FIG. 9 in the memory not illustrated, and compresses a header on the basis of the data 141 and 142.

As described above, CIDs and TEIDs notified from the IMS server 50 are registered in the filter data 141. The example of FIG. 9 illustrates that communication with a particular destination (the UE 10-2) via a particular protocol (RTP) uses "CID=201" representing a bypass identifier as the CID of the ROHC and that an entry that represents the identification information (DL_TEID)="333" of the tunnel route should be attached is registered in the first place. Since the bypass processing of the remaining entries are not available (FALSE) so that the corresponding DL_TEID are not defined.

Besides, CIDs and sequence numbers (SN) to be used in compression of the ROHC, internal states (state machine) about compression and other data are registered for each individual profile (e.g., UDP/IP, TCP/IP, not compressed, and RTP/UDP/IP) in the context data 142. On the basis of the contest data 142, the ROHC processor 14 can compress a header in accordance with the profile.

The lower layer processor 15 carries out protocol processing determined in a lower layer than the PDCP layer. For example, the lower layer processor 15 has a function (processing stack) of processing (e.g., termination and replacement of headers) data of various protocols of, for example, the RLC layer, the MAC (Media Access Control) layer, a physical (PHY) layer.

The application unit 16 has various application programs (software) for, for example, voice communication over VoIP and data communication via HTTP, FTP, and others, and carries out processing (creation, transmission, and reception of packets) in accordance with the programs.

(Description of Operation)

Figure 10:
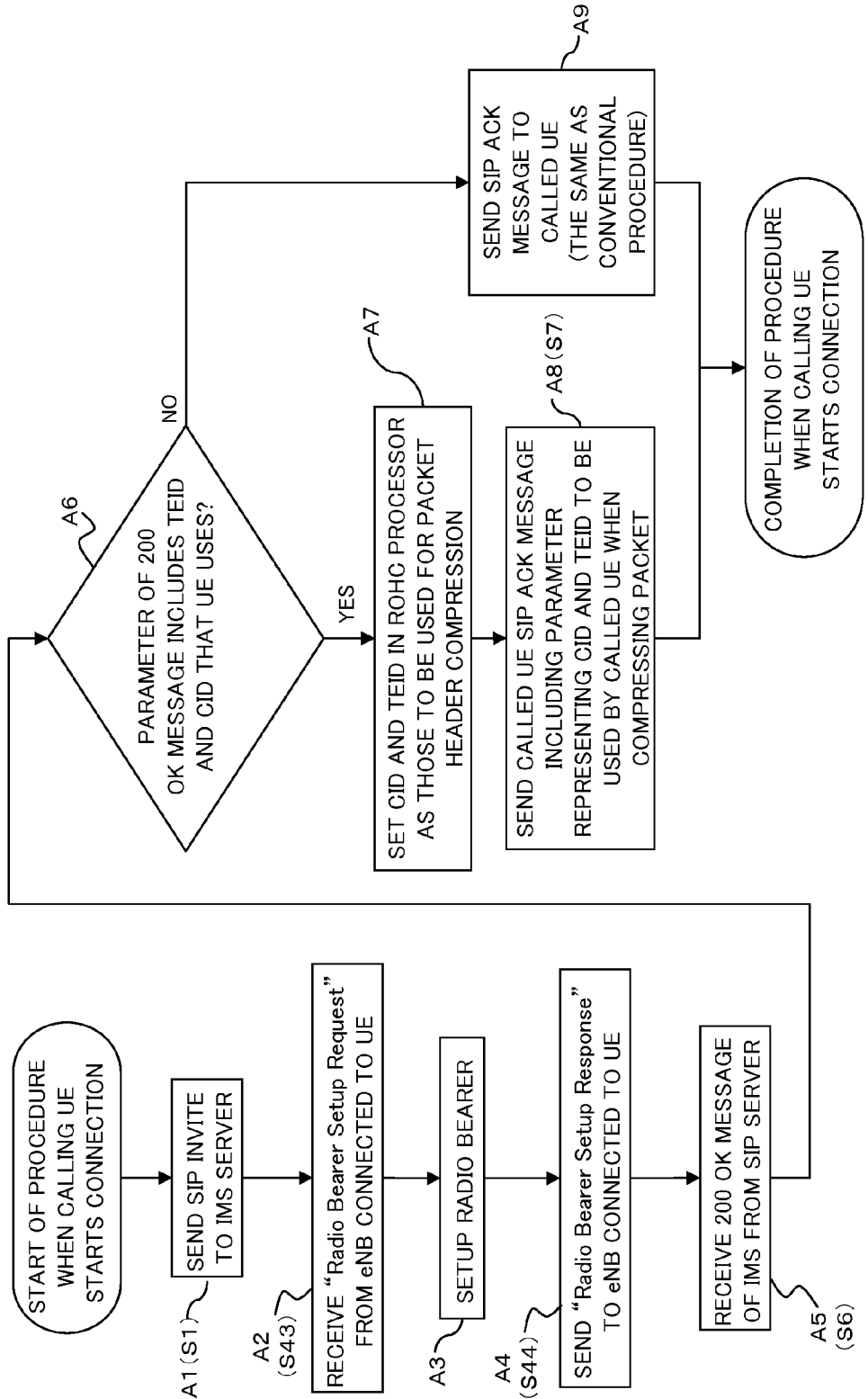
[FIG. 10] A flow diagram illustrating operation at the start of the connection of the UE (calling end) of FIG. 9.
Figure 11:
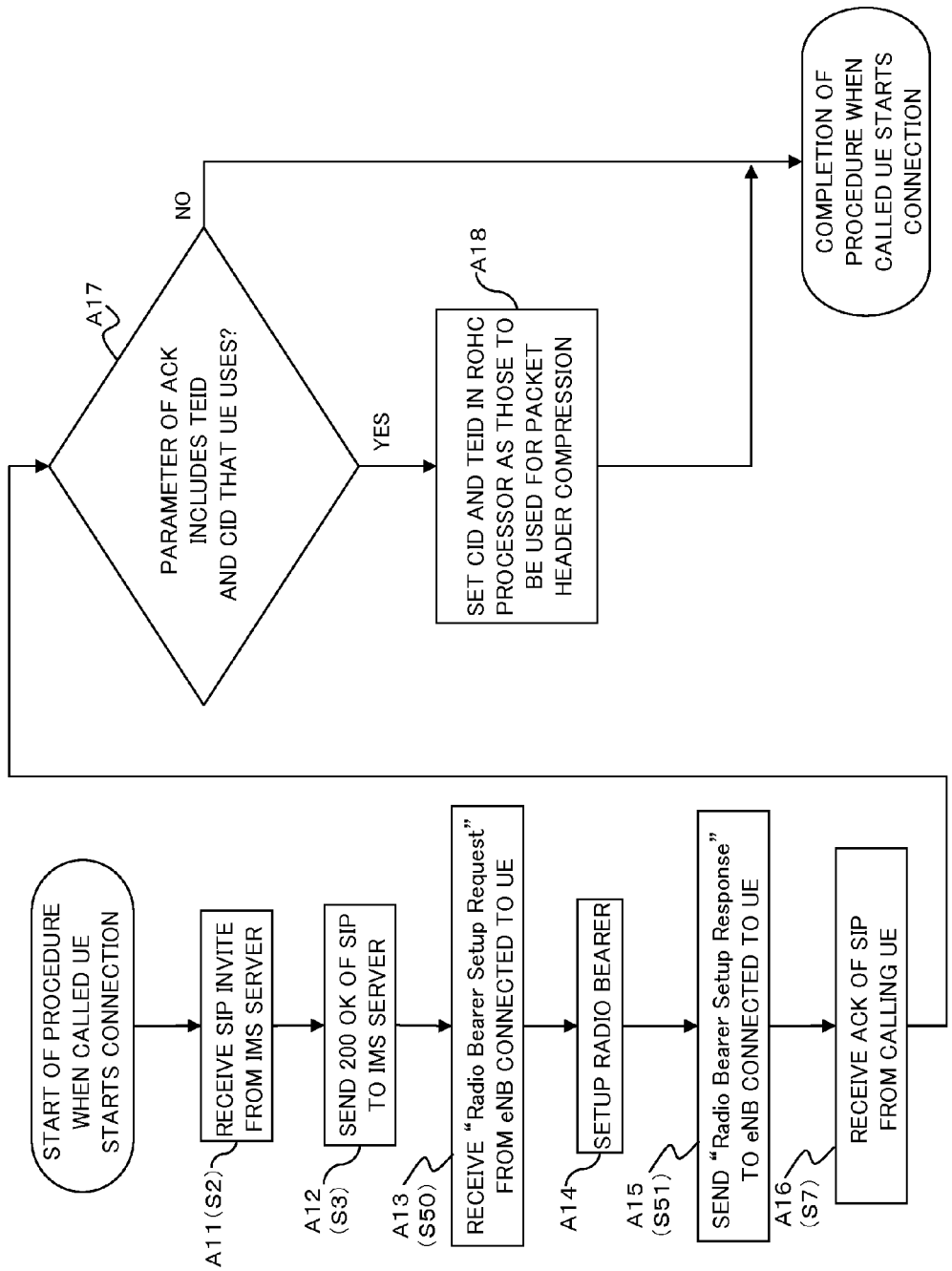
[FIG. 11] A flow diagram illustrating operation at the start of the connection of the UE (called end) of FIG. 9.
Figure 12:
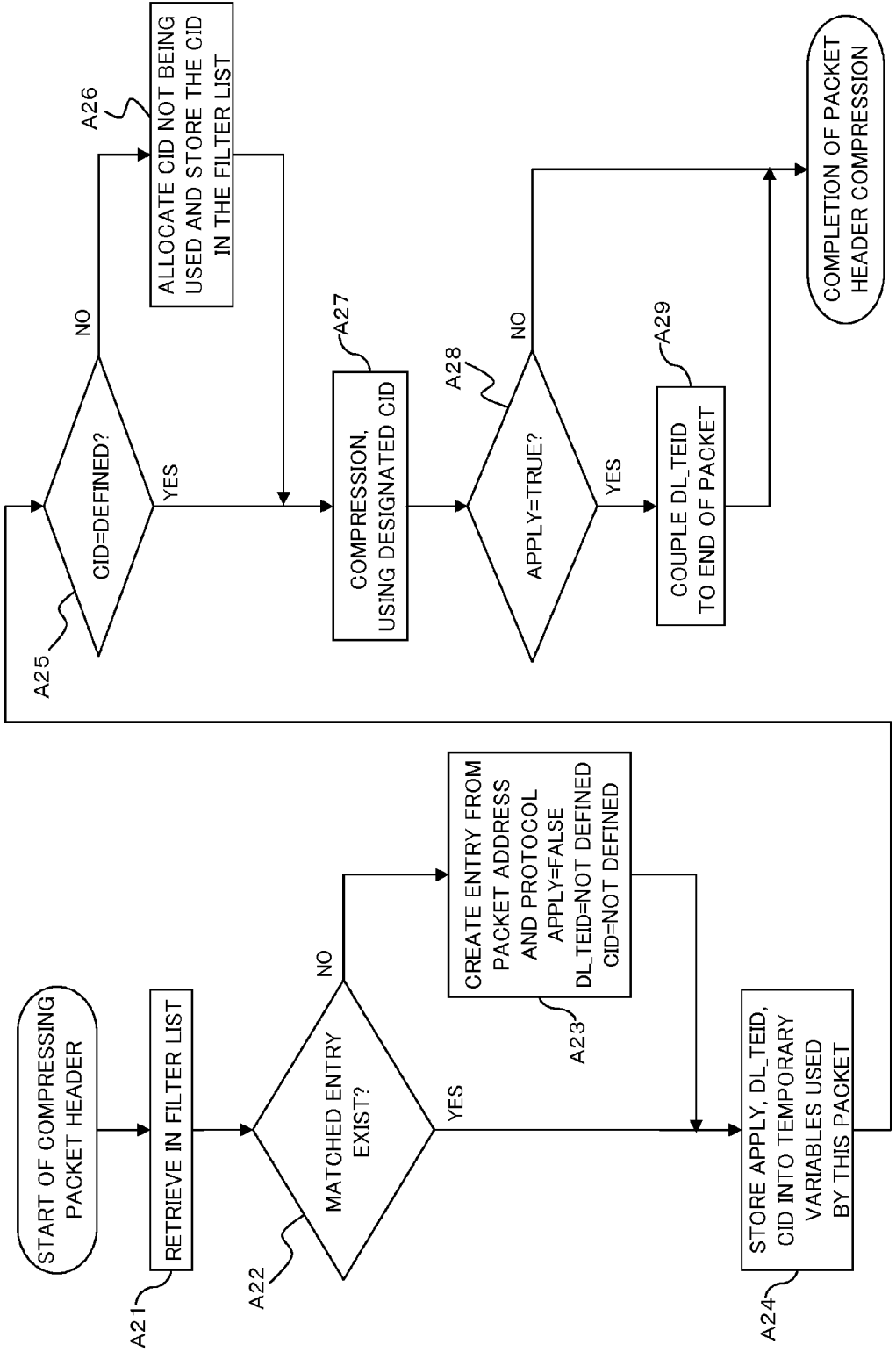
[FIG. 12] A flow diagram illustrating header compression processing of the UE of FIG. 9.

Hereinafter, description will now be made in relation to operation of the UE 10 of the first embodiment having the above configuration with reference to FIGS. 10 through 12. FIG. 10 is a flow diagram of operation at the start of connection when the UE 10 is the calling end; FIG. 11 flow diagram of operation at the start of connection when the UE 10 is the called end; and FIG. 12 is a flow diagram of header compression operation.

(Operation at Start of Connection at the Calling UE)

As illustrated in FIG. 10, when the calling UE 10 (UE 10-1) is to communicate (e.g., voice communication via the VoIP) with the called UE 10 (UE 10-2), the bearer manager 11 and the IMS processor 12, in cooperation with each other, create "INVITE" message of SIP and sends the "INVITE" message to the IMS server 50 through the lower layer processor 15 (step A1), which corresponds to the process at step S1 in FIG. 8.

After that, the UE 10-1 sends to the IMS server 50 a response (200 OK) to "INVITE" message, and the IMS server 50 starts the bearer establishment processing. During the processing, upon receipt of the Radio Bearer Setup Request (see step S43 in FIG. 3) sent from the eNB 20-1 that the UE 10-1 connects to (step A2), the IMS server 50 causes the bearer manager 11 sets the Radio bearer (step A3).

Next, the IMS processor 12 of the UE 10-1 creates a response (Radio Bearer Setup Response) to the Radio Bearer Setup Request, and sends the response to the eNB 20-1 (step A4), which corresponds to the process at step S44 in FIG. 3.

Then, upon completion of the bearer establishment processing mainly conducted by the IMS server 50 and upon receipt of the SIP message (200 OK) (step A5), the IMS processor 12 of the UE 10-1 confirms whether a CID and a TEID are set as parameters in the received SIP message (step A6).

When the confirmation concludes that these are not set (NO in step A6), the UE 10-1 (the IMS processor 12) creates an acknowledgment (ACK) message to the received SIP message (200 OK) and sends the created message through the lower layer processor 15 to the called UE 10-2 (step A9).

Conversely, when a CID and a TEID are set in the received SIP message (200 OK) (i.e., when the UE 10-1 receives the SIP message of step S6 in FIG. 8), the UE 10-1 (the IMS processor 12) sets these parameters, as the CID and the TEID that are to be used in header compression of the ROHC, into the ROHC processor 14 through the bearer manager 11 and the upper layer processor 13 (from YES route of step A6 to step A7).

Next, the UE 10-1 (the IMS processor 12) creates an ACK message of SIP including the CID and the TEID that are to be used in compression of a sending packet by the called UE 10-2, and sends the created message to the called UE 10-2 through the lower layer processor 15 (step A8), which corresponds to the process at step S7 of FIG. 8.

(Operation at the Start of Connection of the Called UE)

Responsively, as illustrated in FIG. 11, upon receipt of "INVITE" of SIP described in step S3 of FIG. 8 from the IMS server 50 (step A11), if the UE 10-2 agrees with start communication with the UE 10-1, the UE 10-2 causes the IMS processor 12 to create the response message (200 OK) to the received "INVITE" message and sends the created message to the IMS server 50 through the lower layer processor 15 (step A12), which corresponds to the process at step S3 of FIG. 8.

After that, when the called UE 10-2 receives the Radio Bearer Setup Request (see step S50 in FIG. 3) sent from the IMS server 50 from the eNB 20-2 that the UE 10-2 connects (step A13) through starting the bearer establishment processing by the IMS server 50, the bearer manager 11 of the UE 10-2 sets the Radio bearer (step A14).

Subsequently, the UE 10-2 causes the IMS processor 12 to create a response (Radio Bearer Setup Response) to the Radio Bearer Setup Request and sends the created message to the eNB 20-2 (step A15), which corresponds to the process at step S51 of FIG. 3.

Upon receipt (step A16) of the ACK message of SIP sent from the calling UE 10-1 in step S7 of FIG. 8 (i.e., step A8 or A9 in FIG. 10), the called UE 10-2 causes the IMS processor 12 to confirm whether the TEID and the CID that the UE 10-2 itself is to use are set in the received ACK message (step A17).

When the confirmation concludes that these parameters are not set, the UE 10-2 finishes the processing of starting the connection, and carries out normal communication, in which the bypass processing is not performed, between the UE 10-1 (No route of step A17).

Conversely, when these parameters are set (i.e., the SIP message of step S7 in FIG. 8 is received), the UE 10-2 (the IMS processor 12) sets these parameters, as the CID and the TEID that are to be used in header compression of the ROHC, in the ROHC processor 14 through the bearer manager 11 and the upper layer processor (from Yes route from step A17 to step A18).

(Operation of Header Compression by UE)

After the parameters (i.e., the CIDs and the TEIDs) are set in the ROHC processors 14 of the calling UE 10-1 and the called UE 10-2, each ROHC processor 14 compresses header of a packet to be sent in accordance with the flow diagram of FIG. 12.

Specifically, in the event of presence of a sending packet, the ROHC processor 14 refers to and retrieves in the filter data 141 (step A21), and confirms the presence and the absence of an entry corresponding to the CID and the TEID set (step A22).

When the confirmation concludes the absence of the corresponding entry, the ROHC processor 14 creates a new entry having "APPLY=FALSE, DL_TEID=not defined, CID=not defined" on the basis of the address and the protocol of the sending packet (No route of step A22 to step A23).

In contrast, the confirmation concludes the presence of the corresponding entry, the ROHC processor 14 stores the content of the same entry (APPLY, DL_TEID, CID) as temporal variables that is to be used for the header compression of the sending packet (step A24), and confirms whether the CID is already defined (step A25).

When the CID is not defined (NO in step A25), the ROHC processor 14 allocates a CID not being used other than the CIDs for packets to be bypassed (tunneled) to the entry, stores the allocated CID into the filter list 141 (step A26), and compresses the header, using the context of the stored CID (step A27). On the other hand, when the CID is already defined (YES in step A25), the ROHC processor 14 compresses the header, using the context of the CID (step A27). The CID is header information piece of the ROHC packet.

The ROHC processor 14 confirms whether the temporarily variable "APPLY" is "TRUE" (step A28). If the variable is "TRUE" (YES in step A28), the ROHC processor 14 attaches (combines) the DL_TEID to the end of the sending packet (step A29) and completes the header compression. On the other hand, if the variable is "FALSE" (NO in step A28), the ROHC processor 14 finishes the header compression.

Namely, the ROHC processor 14 of the present embodiment includes a function of an attaching unit which attaches information (CID,TEID) that is to be used to recognize whether or not header decompression processing is required by data compressed and to recognize the tunnel route to the destination UE 10-2 to the compressed data destined for the UE 10-2. In addition, the lower data processor 15 includes a function of a sender which sends to the network the compressed data having the above information attached.

The header decompression processing is the same as that conventionally performed, so repetitious description is omitted here.

Figure 13:
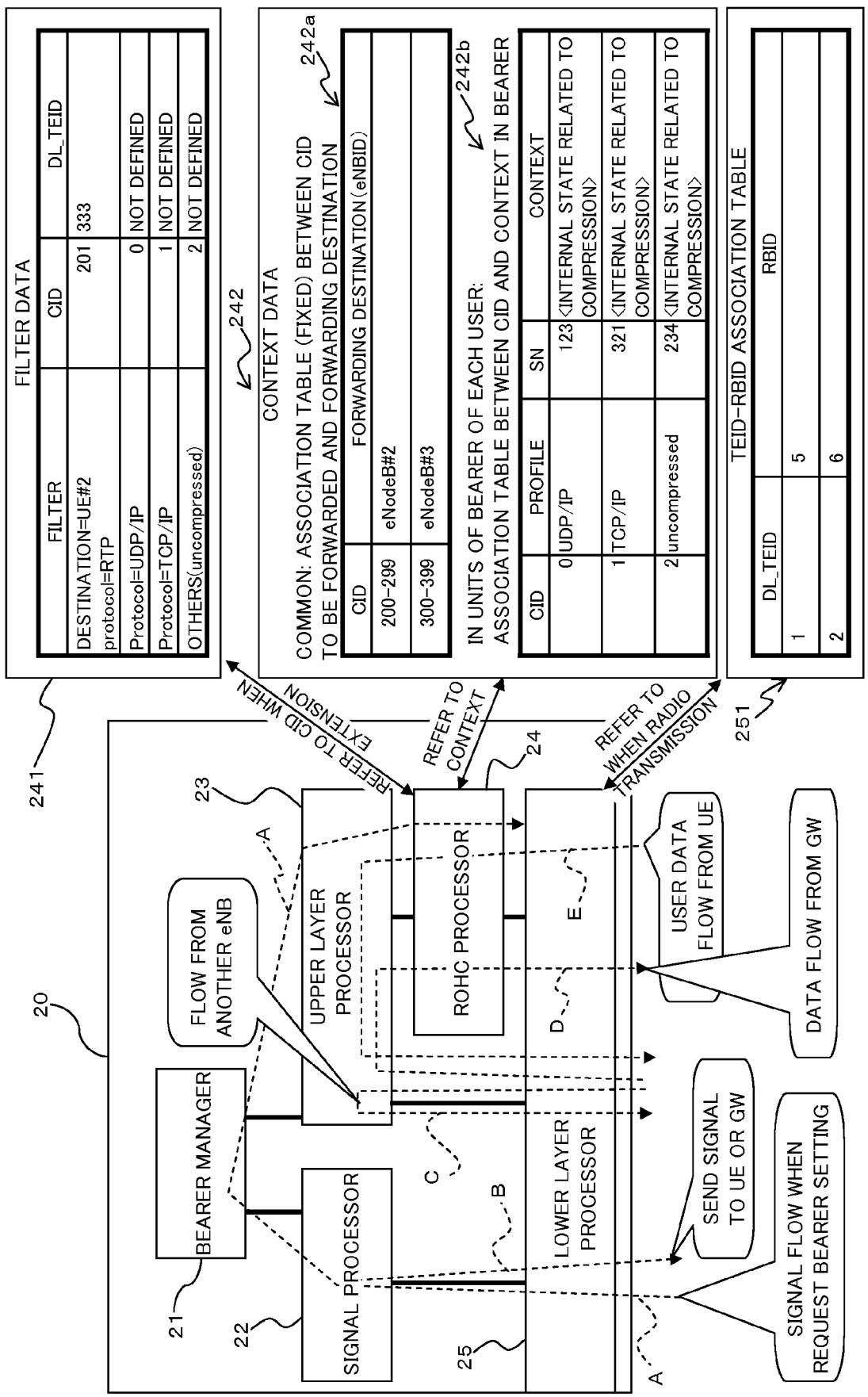
[FIG. 13] A flow diagram illustrating the configuration (function) of a radio base station (eNB) of the first embodiment.

(3.2) Description of eNB:

FIG. 13 is a block diagram illustrating the configuration of eNB 20. The eNB 20 of FIG. 13 includes, a bearer manager 21, a signal processor 22, an upper layer processor 23, an ROHC processor 24, and a lower layer processor 25.

Also in FIG. 13, dotted arrows A through E indicate routes (flows) of signal forwarding in the eNB 20: arrow A representing a signal flow at bearer establishment request; arrow B representing a signal flow to the UE 10 or the GW 30; arrow C representing a data flow from another eNB 20; and arrow D representing a data flow from the GW 30; and arrow E representing a user data flow from the UE 10.

In detail, the signal flow A represents that the upper layer processor 23, the ROHC processor 24, and the lower layer processor 25 can be set accordingly to the bearer setting while the signal flows through, in sequence, the lower layer processor 25, the signal processor 22, the bearer manager 21, the upper layer processor 23, the ROHC processor 24, and the lower layer processor 25. The signal flow B indicates that a signaling message created by the signal processor 22 is sent to the UE 10 or the eNB 20 after being subjected to predetermined protocol processing in the lower layer processor 25.

The data flow C indicates that a packet received from the eNB 20 is subjected to required protocol processing while passing through, in sequence, the lower layer processor 25, the upper layer processor 23, and the lower layer processor 25 and then is sent to another eNB 20. The data flow D indicates that the packet received from the GW 30 is processed while passing through, in sequence, the lower layer processor 25, the upper layer processor 23, the ROHC processor 24, and the lower layer processor 25. The data flow E indicates that a packet received from the UE 10 is processed while passing through, in sequence, the lower layer processor 25, the ROHC processor 24, the upper layer processor 23, and the lower layer processor 25.

Here, the bearer manager 21 has functions of managing the bearer of the UE-10 end (DL) and the bearer of the GW-30 end (UL) and performing, in cooperation with the signal processor 22, establishment of DL and UL bearers (creation, sending, and receiving messages).

The signal processor 22 has functions of creating messages (e.g., a Radio bearer setup request destined for the UE 10, Create dedicated bearer response destined for the GW 30) responsive to the request from the bearer manager 21, sending created messages to the UE 10 and GW 30, and receiving messages (e.g., Radio bearer setup response, Create dedicated bearer request) sent from UE 10 and the GW 30.

The upper layer processor 23 carries out processing defined in upper layers than the PDCP (ROHC) layer, and has, for example, a function of processing (termination and replacement of headers) data of various protocols such as IP, UDP, and RTP (RTCP). The upper layer processor 23 forwards a received packet (tunnel packet) that is forwarded to the upper layer processor 23 without being subjected to decompression processing in the ROHC processor 24 to the GW 30 through the lower layer processor 25.

The ROHC processor 24 has functions of compressing a header of ROHC packet and of decompressing the header of a received ROHC packet. In the first embodiment, the ROHC processor 24 stores filter data (list) 241 and context data 242 illustrated in FIG. 13 in a memory not-illustrated or the like, and compresses and decompresses the header of an ROHC packet.

The filter list 241 has the same content as the filter list 141 of the UE 10 and is data to be used for recognizing the suitability (available/not-available) of the bypass processing. In the eNB 20, the CID and the TEID to be bypassed are previously registered.

Accordingly, when the CID and the TEID of an entry registered in the filter list 241 are set in the ROHC packet received from the UE 10, the ROHC processor 24 forwards the received ROHC packet to the upper layer processor 23 without decompressing the header of the packet.

The context data 242 is data used for recognizing a context to be used in the header compression by the ROHC and, as illustrated in FIG. 13, includes an association table 242a common to the eNBs 20 and an association table 242b for each bearer of the UE 10.

The association table 242a corresponds to Table 1 above. Referring to and retrieving in the association table 242a on the basis of the CID attached to a received packet makes it possible to specify the forwarding (tunneling) destination (i.e., the eNB 20 that the called UE 10 connects).

The remaining association table 242b is the same as the context data 141 of the UE 10 and registers a CID and a sequence number (SN) to be used for compression by the ROHC, and an internal state (state machine) concerning compression in units of bearers between the UEs 10. Accordingly, the ROHC processor 24 can compress a header in accordance with the profile for each bearer on the basis of the association table 242b.

The lower layer processor 25 carries out processing defined by a lower layer than the PDCP layer and has a function (processing stack) of processing (e.g., termination and replacement of headers) data of various protocols of the RLC layer, the MAC layer, a physical (PHY) layer.

The assembly (attachment of a TEID) of a tunnel packet may be carried out by the ROHC processor 24, which is capable of specifying the TEID (in other words, the TEID is included as the payload of the PDCP packet). However, when the format of (2) of FIG. 7 is assembled (the TEID is included as the payload of the GTP packet), the lower layer processor 25 assembles the tunnel packet.

In the latter case, the TEID specified by the ROHC processor 24 is forwarded to the lower layer processor 24 (sic, correctly 25) along with the ROHC packet to be tunneled. This makes the called-end eNB 20-2 to specify the TEID in the process performed in a lower layer (the lower layer processor 25), so that the packet can be forwarded to the calling UE 10-2 in an early stage.

The lower layer processor 25 carries out processing defined in lower layers than the PDCP layer, and has a function (processing stack) of processing (e.g., termination and replacement of headers) data of various protocols of the RLC layer, the MAC layer, a physical (PHY) layer. The lower layer processor 25 stores an association table 251 between a TEID and an RBID in a memory not-illustrated or the like as illustrated in FIG. 13, and referring to and retrieving in the association table 251 on the basis of the TEID attached to the tunnel packet received from the GW 30 makes the lower layer processor 25 possible to recognize the RBID (i.e., a radio (DL) link to the called UE 10-2) to which the tunnel packets should be sent.

(Description of Operation)

Figure 14:
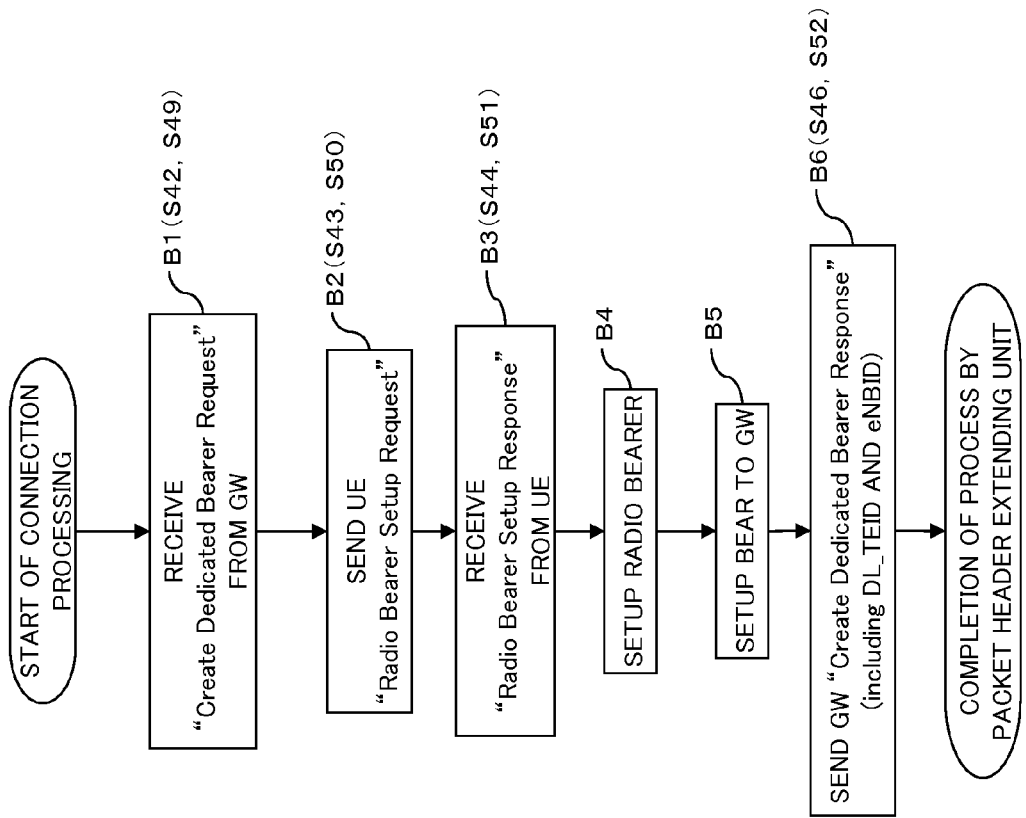
[FIG. 14] A flow diagram illustrating operation at the start of the connection of the eNB of FIG. 13.
Figure 15:
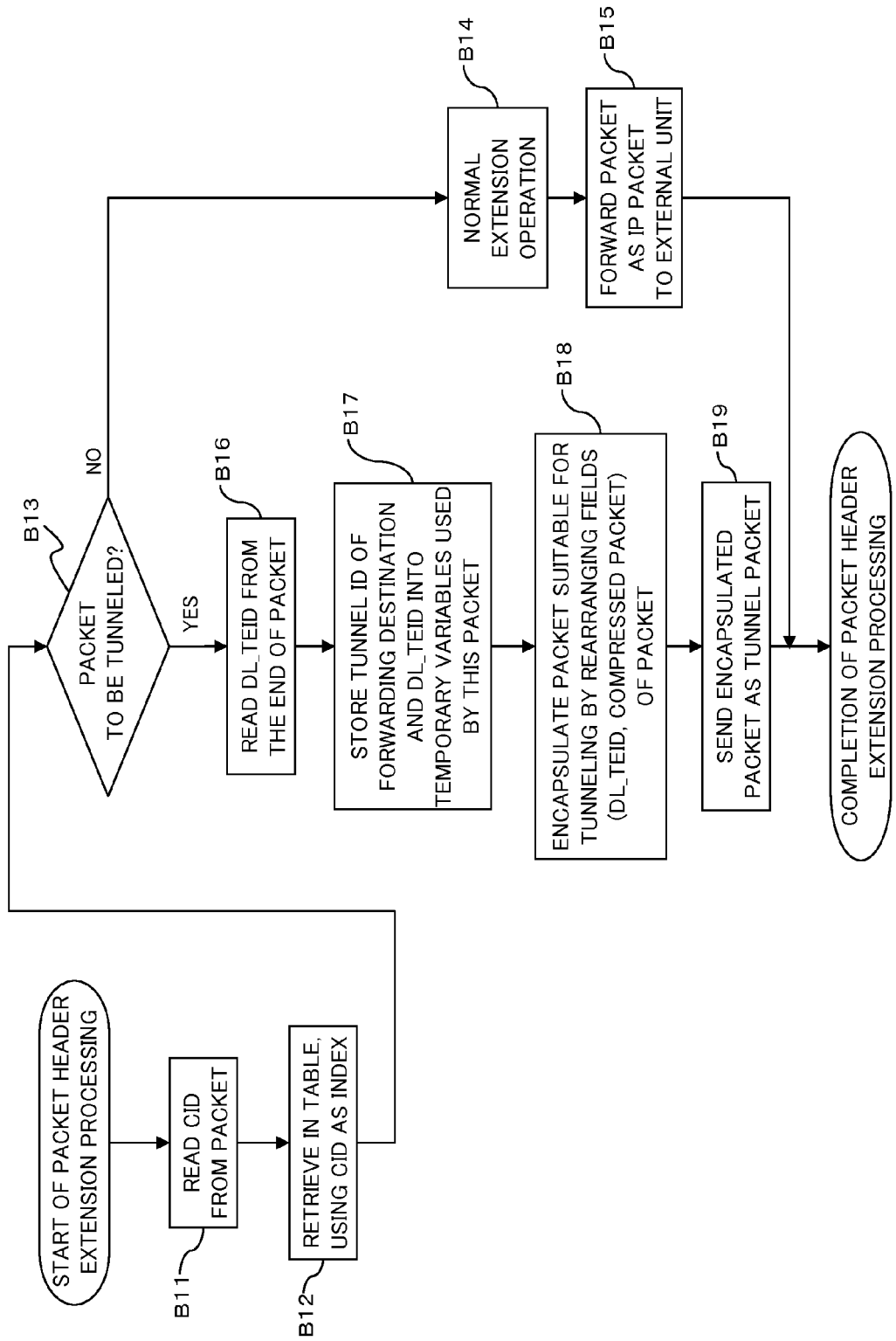
[FIG. 15] A flow diagram illustrating operation of the eNB of FIG. 13 when receiving an uplink (UL) packet.
Figure 16:
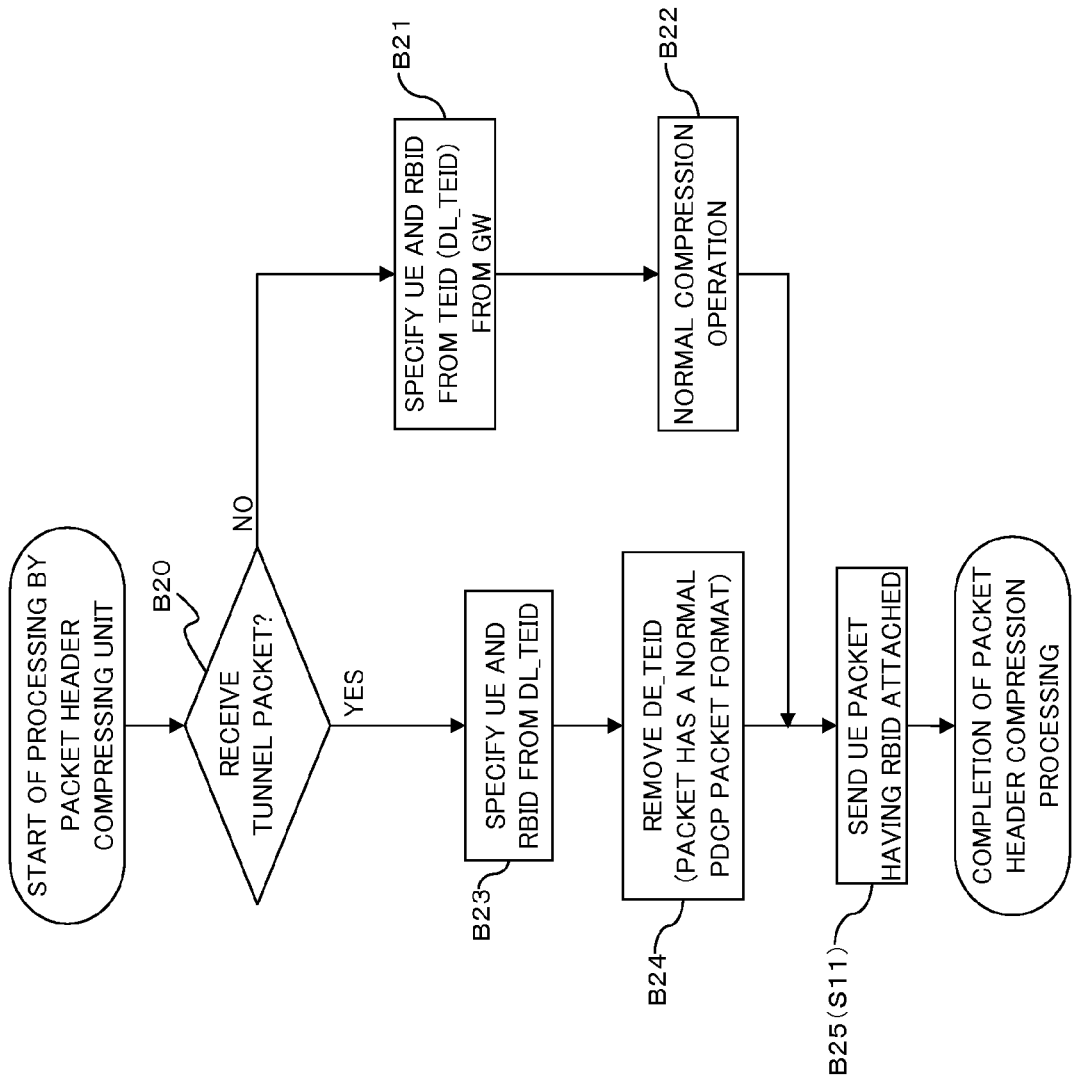
[FIG. 16] A flow diagram illustrating operation of the eNB of FIG. 13 when receiving a downlink (DL) packet.

Hereinafter, description will now be made in relation to operation of the eNB 20 having the above configuration with reference to FIGS. 14-16. FIG. 14 is a flow diagram illustrating an operation at the start of connection (calling connection) by the eNB 20; FIG. 15 is a flow diagram illustrating operation when receiving an UL packet from the UE 10; and FIG. 16 is a flow diagram illustrating operation when receiving a DL packet from the GW 30.

(Operation at the Start of Connection)

Upon receipt (step B1) of "Create Dedicated Bearer Request" message of step S42 and S49 of FIG. 3 from the GW 30, the bearer manager 21 and the signal processor 22 in the eNB 20 cooperatively create "Radio Bearer Setup Request" message destined for the UE 10 and send the created message to the UE 10 through the lower layer processor 25 (step B2), which corresponds to the processing of step S43 or S50 of FIG. 3.

After that, upon receipt (step B3) of "Radio Bearer Setup Response" of step S44 and S51 in FIG. 3, the eNB 20 (the bearer manager 21 and the signal processor 22) sets the Radio bearer between the eNB 20 and the UE 10 (step B4), and further sets a dedicated bearer between the eNB 20 and the GW 30 (step B5). These bearer settings may be carried out in the reverse order or in parallel.

In succession, the eNB 20 (the bearer manager 21 and the signal processor 22) creates the "Create Dedicated Bearer Response" message and sends the created message to the GW 30 through the lower layer processor 25 (step B6). As described in step S4 of FIG. 8, this message includes the TEID (DL_TEID) of the DL and identification information (eNBID) of the eNB 20 itself. This procedure corresponds to the process at step S46 or S52 in FIG. 3. The TEID is stored in eNB 20 for the judgment as to whether or not the GTP packet received from the GW 30 is a tunnel packet.

(Cases of Receiving an UI Packet from UE)

As illustrated in FIG. 15, upon receipt (step B11) of an UL packet from the UE 10 after the completion of the bearer establishment processing and the start of communication between the UEs 10, the ROHC processor 24 of the eNB 20 detects the CID attached to the received packet, and refers to and retrieves in the filter list 241 on the basis of the detected CID (step B12) to confirm the requirement of decompression processing (whether or not the packet is one to be tunneled) (step B13).

As the result of the confirmation, if the received packet is not one to be tunneled, which the decompression processing is not required (NO in step B13), the ROHC processor 24 specifies the context to be used for decompressing the compressed packet on the basis of the association table 242*b* in the context data 242, decompresses the packet (compressed packet) through the use of the specified packet (step B14), and forwards the decompressed packet, as an IP packet, to an external unit (GW 30) through the lower layer processor 25 (step B15).

On the other hand, if the received packet is one to be tunneled, which does not require decompression processing (YES route in step B13), the ROHC processor 24 reads the TEID attached to the end of the received packet (step B16), and stores the forwarding destination (tunnel ID=eNBID) and the read TEID as temporary variables (step B17) to be used for processing the packet. The forwarding destination (eNBID) is obtained from the association table 242*a* of the context data 242. In the example of FIG. 13, the packet having CID=201 should be sent to the called-end eNB 20-2 that is to be identified with eNBID=#2.

Then the ROHC processor 24 attaches the PDCP header to the compressed packet as a PDCP packet and forwards the PDCP packet along with the TEID to the lower layer processor 25 through the upper layer processor 23. The lower layer processor 25 attaches the GTP header for tunneling to the TEID and PDCP packet that are forwarded. The tunneling GTP header includes, for example, address information of the called-end eNB 20 having the S1 interface recognized by the TEID. Thereby, a GTP packet having a format of (2) in FIG. 7 is assembled and is sent to the GW 30 (steps B18 and B19), which corresponds to the process at step S9 of FIG. 8.

Namely, the lower layer processor 25 of the first embodiment includes a function of a receiver which receives compressed data having particular CID and TEID attached thereto by the UE 10-1 from the UE 10-1, and the ROHC processor 24 includes a function of a recognizer which recognizes the requirement of header decompression processing on the received compressed data and which recognizes the forwarding route to the destination UE 10-2. The lower layer processor 25 also includes a function of a sender which sends compressed data which is recognized not to require the header decompression processing to the recognized forwarding route without decompressing the header of the compressed data.

(Cases of Receiving a DL Packet from the GW)

As illustrated in FIG. 16, upon receipt of a DL packet (GTP packet) from the GW 30 after the bearer establishment processing is completed and thereby the communication between the UEs 10 is started, the eNB 20 causes the lower layer processor 25 to terminate, analyze the GTP header and confirm whether the TEID (DL_TEID) set in the GTP header is for tunneling (step B20).

Namely, if the TEID of the GTP header coincides with the TEID notified and stored during the above bearer establishment processing, the received packet is judged to be a tunnel packet. Conversely, if the two TEIDs do not coincide with each other, the received packet is judged to be a normal packet (that is, a packet for which decompression processing is not bypassed).

As the result of the confirmation, if the received packet is a tunnel packet, the eNB 20 (the lower layer processor 25) refers to and retrieves in the TEID-RBID association table 251 on the basis of the TEID (DL_TEID) attached to the payload of the received GTP packet, so that the RBID to the destination UE 10 is specified (from YES route of step B20 to step B23).

Then, the lower layer processor 25 creates a normal PDCP packet through removal of the TEID, and attaches an RLC header including the specified RBID to the created PDCP packet to thereby create an RLC packet having a format denoted in (4) of FIG. 7, which the lower layer processor 25 is sent to the destination UE (step B25), which corresponds to the process at step S11 in FIG. 8.

On the other hand, when the DL packet received from the GW 30 is not a tunnel packet (NO in step B20), the eNB 20 (the lower layer processor 25) specifies the RBID to the destination UE 10 on the basis of the TEID set in the GTP header of the received GTP packet (step B21), and forwards the GTP payload (PDCP packet) to the ROHC processor 24.

The ROHC processor 24 carries out a normal header compression processing on the forwarded PDCP packet through allocating a CID not being used to the packet (step B22). The resultant compressed packet is forwarded through the upper layer processor 23 to the lower layer processor 25, in which the packet is transformed into an RLC packet having the specified RBID included in the RLC header and the RLC packet is sent to the destination UE 10 (step B25).

Figure 17:
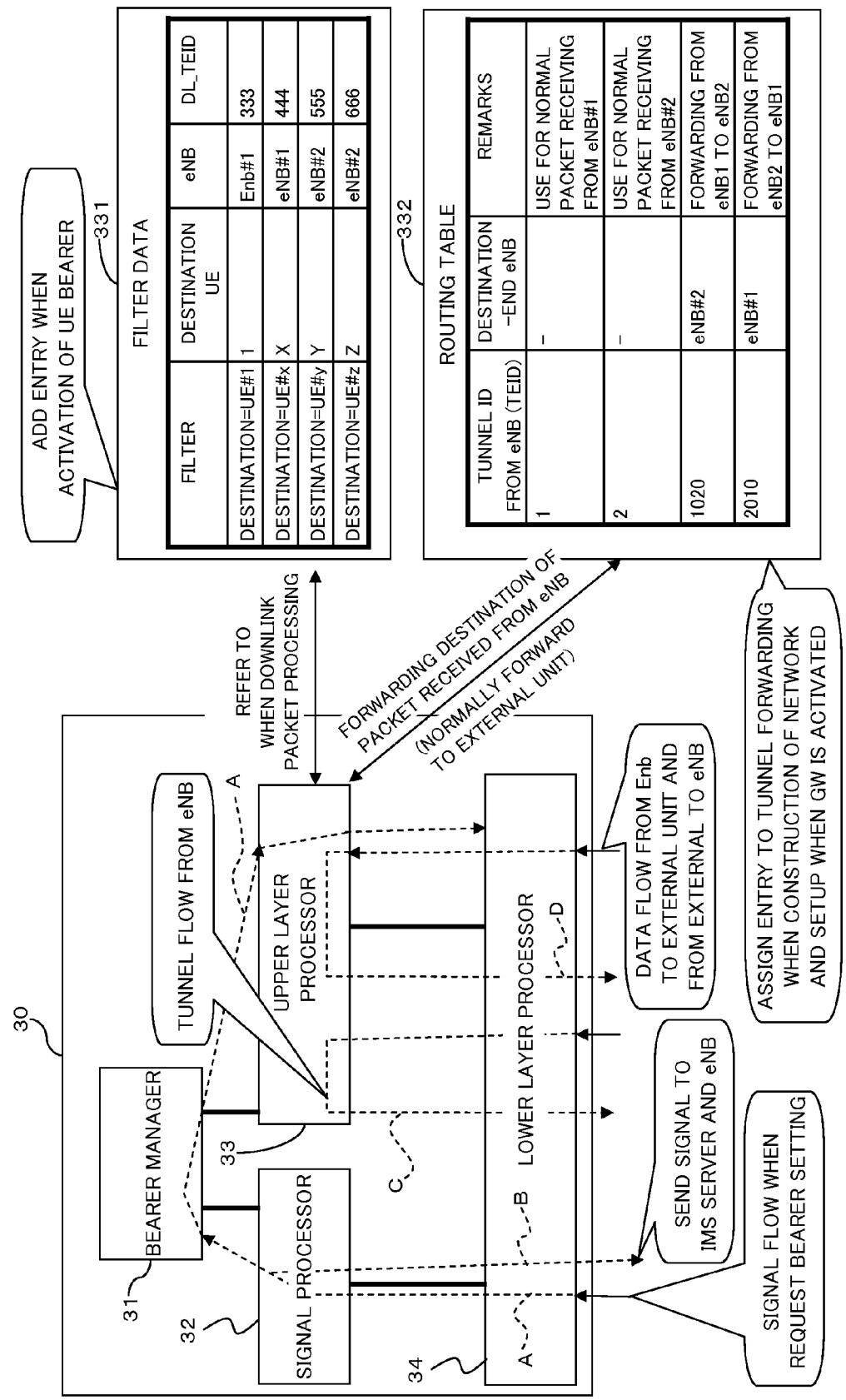
[FIG. 17] A block diagram illustrating the configuration (function) of a gateway (GW) according to the first embodiment.

(3.3) Description of the GW:

FIG. 17 is a block diagram illustrating the configuration of the GW 30. The GW 30 illustrated in FIG. 17 includes, for example, a bearer manager 31, the signal manager 32, an upper layer processor 33, and a lower layer processor 34.

Also in FIG. 17, arrows A through D represent signal forwarding routes (flows) in the GW 30. Arrow A represents a signal flow at the bearer establishment request; arrow B represents a signal flow to the IMS server 50 or to the eNB 20; arrow C represents a tunnel flow from the eNB 20; and arrow D represents a data flow from the UE 10 to an external network such as Internet and from an external network to the UE 10.

Specifically, the signal flow A indicates that the upper layer processor 33 and the lower layer processor 34 are set accordingly to the bearer setting while a signal is passing through, in sequence, the lower layer processor 34, the signal manager 32, the bearer manager 31, the upper layer processor 33, and the lower layer processor 34. The signal flow B indicates that a signaling message created by the signal manager 32 is subjected to predetermined protocol processing in the lower layer processor 34 and is then sent to the IMS server 50 or the eNB 20.

The data flow C indicates that a tunnel packet received from the eNB 20 passes through, in sequence, the lower layer processor 34, the upper layer processor 33, and the lower layer processor 34 during which the packet is subjected to required protocol processing by respective processors, and the packet is then sent to the eNB 20. The data flow D indicates that a received packet is processed while passing through, in sequence, the lower layer processor 34, the upper layer processor 33, and the lower layer processor 34, for example.

Here, the bearer manager 31 has a function of managing the bearers between the eNB 20 (both the calling-end eNB 20-1 and the called-end eNB 20-2) and the GW 30 itself, and also has another function of performing, in cooperation with the signal manager 32, the bearer establishment processing (creation, receiving, and sending of messages).

The signal manager 32 has functions of creating messages (e.g., "Create Dedicated Bearer Request" destined for the eNB 20, "PCC decision proposition ACK" destined for the IMS server 50), sending created messages to the eNB 20 or the IMS server 50, receiving messages (e.g., "Created Dedicated Bearer Response", "PCC decision Proposition") sent from the eNB 20 or the IMS server 50.

The upper layer processor 33 carries out processing defined in an upper layer than the PDCP (ROHC) layer, and has a function of, for example, processing (termination and replacement of headers) data conforming to various protocols, such as IP, UDP, and RTP (RTCP). The upper layer processor 33 stores filter data (list) 331 and a routing table 332 depicted in FIG. 17 in a memory not-illustrated and decides (controls) a forwarding destination of a received packet on the basis of the data 331 and the table 332.

The filter list 331 is data used for recognizing the destination of a packet forwarded from an external network, such as Internet. As illustrated in FIG. 17, information (eNBID) to recognize an eNB 20 that the UE 10 connects and TEID (DL_TEID) to recognize the tunnel route to the eNB 20 are registered for each UE 10 in the filter list 331.

In processing a DL packet received from an external network, the upper layer processor 33 can recognize an eNB 20 that the destination UE 10 connects to which eNB 20 and that which TEID should be attached to the GTP header in order to forward the packet to the recognized eNB 20 with reference to the entries in the filter list 331 on the basis of the destination address information of the packet being processed. The filter list 331 is formed of entries based on information notified, for example, while the bearer establishment processing described with reference to FIG. 8.

The routing table 332 is data used to specify the forwarding destination (the destination-end eNB 20) of a packet received from another eNB 20. Into the routing table 332, information (e.g., eNBID) of a destination eNB 20 is registered for information (tunnel ID) to recognize each tunnel route of a packet received from another eNB 20.

For example, in the example of FIG. 17, the lower two entries among the four entries register information (eNBIDs) of forwarding routes of packets on which the header decompression processing is bypassed by calling-end eNBs 20. These entries for tunnel forwarding are allocated when constructing the network and are automatically set when the GW 30 is activated. The remaining two entries are entries for normal packets forwarded from eNBs 20 after being subjected to the header decompression processing.

On the basis of the TEID received from an eNB 20, the upper layer processor 33 refers to and retrieves in entries in the routing table 332, and thereby recognizes the forwarding destination (destination-end eNB 20) of the received packet.

The lower layer processor 34 carries out processing defined in a lower layer than the PDCP layer, and has a function of, for example, processing (e.g., termination and replacement of headers) of data conforming to various protocols such as a physical (PHY) layer, the Ethernet (registered trademark) layers, and others. For example, the lower layer processor 34 replaces the header of the forwarding packet on the basis of the information of the forwarding destination recognized by the upper layer processor 33.

(Description of Operation)

Figure 18:
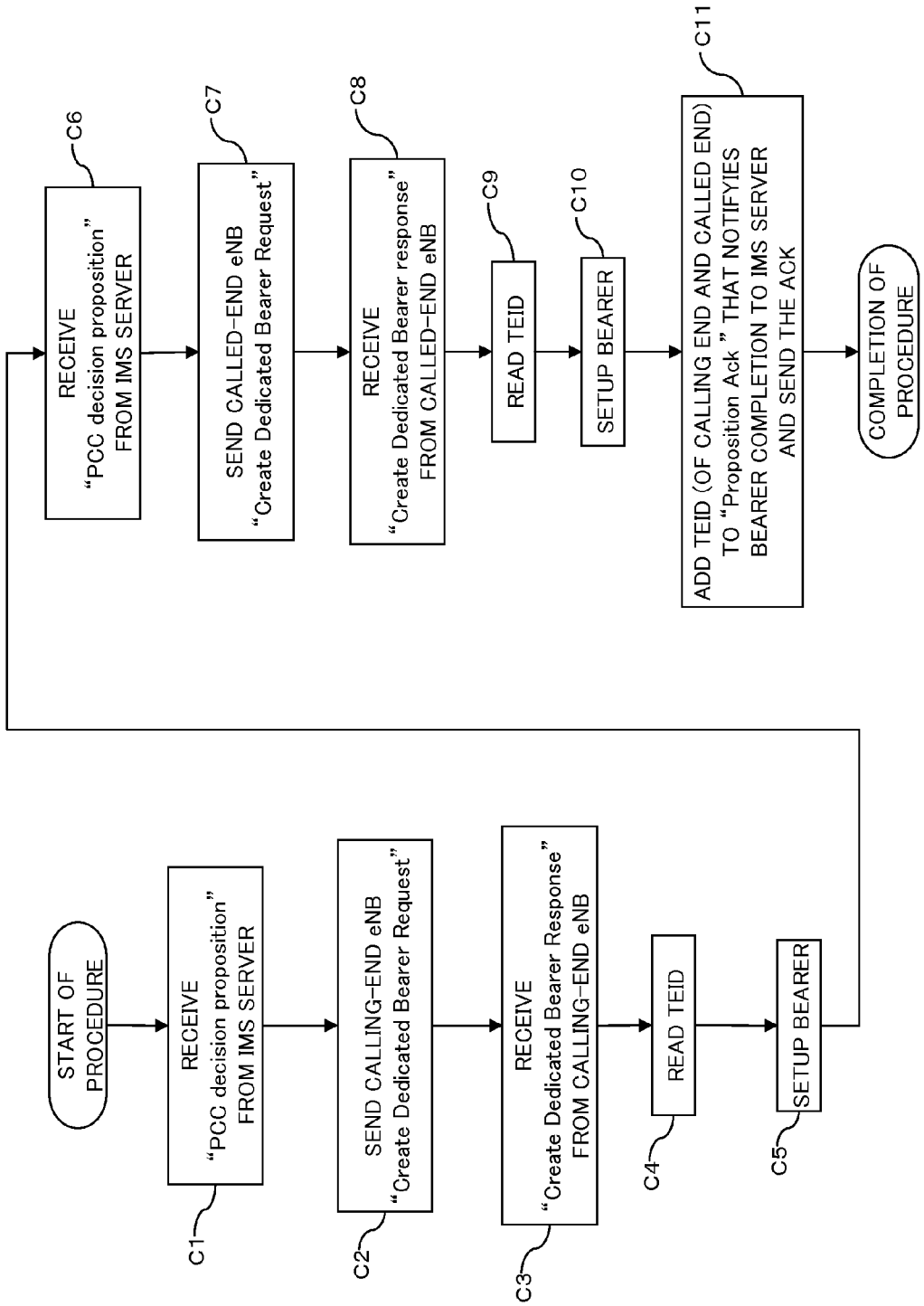
[FIG. 18] A flow diagram illustrating operation at the start of connection of the GW of FIG. 17.
Figure 19:
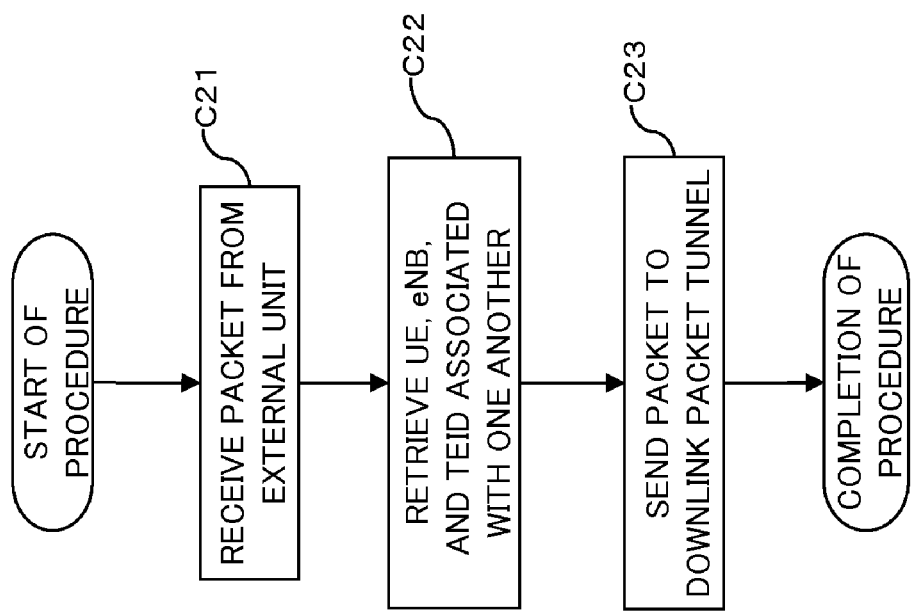
[FIG. 19] A flow diagram illustrating operation of the GW of FIG. 17 when the GW receives a packet from an external network (e.g., Internet)
Figure 20:
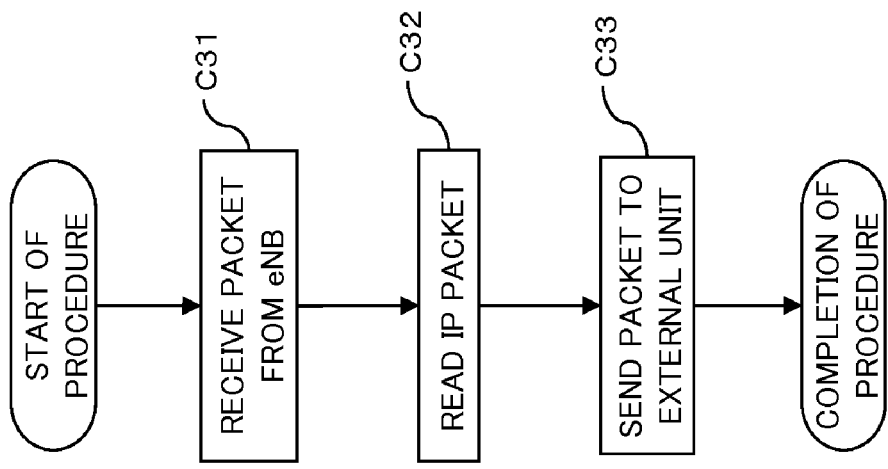
[FIG. 20] A flow diagram illustrating operation of the GW of FIG. 17 when the GW receives a packet destined for an external network (e.g., Internet)
Figure 21:
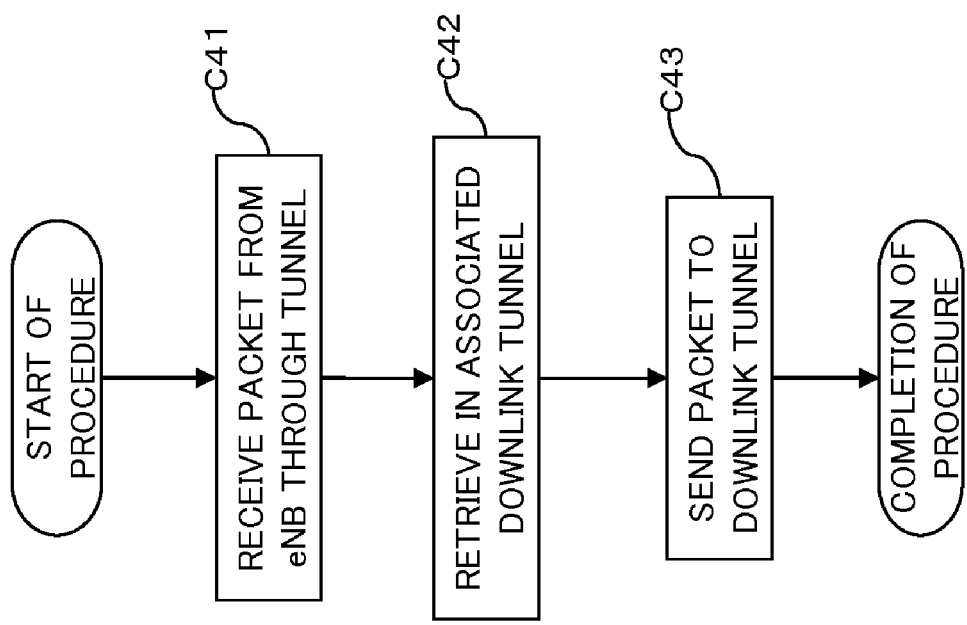
[FIG. 21] A flow diagram illustrating operation of the GW of FIG. 17 when receiving a tunnel packet.

Hereinafter, description will now be made in relation to operation of the GW 30 having the above configuration of the first embodiment with reference to FIGS. 18 through 21. FIG. 18 is a flow diagram illustrating operation that the GW 30 performs at the start of connection (calling connection); FIG. 19 is a flow diagram illustrating operation when receiving a packet from an external network; FIG. 20 is a flow diagram illustrating operation when receiving a packet that is to be forwarded from the GW 30 to an external network; and FIG. 21 is a flow diagram illustrating operation when receiving a tunnel packet.

(Operation at the Start of Connection)

Upon receipt (step C1) of the PCC decision proposition message from the IMS server 50 as described for step S41 of FIG. 3, the GW 30 causes the bearer manager 31 and the signal manager 32, in cooperation with each other, to create a message of Create Dedicated Bearer Request destined for the calling-end eNB 20-1 and forward the created message to the calling-end eNB 20-1 through the lower layer processor 34 (step C2), which corresponds to the process at step S42 in FIG. 3.

After that, upon receipt (step C3) of the response message (Radio Bearer Setup Response) of step S45 of FIG. 3, the GW 30 (the bearer manager 31 and the signal manager 32) reads the TEID set in the received response message (step C4) and establishes the dedicated bearer between the calling-end eNB 20-1 and the GW 30 (step C5). The reading of the TEID and the establishing of the dedicated bearer may be carried out in the reverse order or in parallel.

Next, upon receipt (step C6) of the PCC decision proposition message from the IMS server 50 of step S47 of FIG. 3, the GW 30 (the bearer manager 31 and the signal manager 32) creates a message of Create Dedicated Bearer Request destined for the called-end eNB 20-2 and sends the crated message to the called-end eNB 20-2 through the lower layer processor 34 (step C7), which corresponds to the process at step S48 of FIG. 3.

After that, upon receipt (step C8) of the Create Dedicated Bearer Response message from the called-end eNB 20-2 of step S51 of FIG. 3, the GW 30 (the bearer manager 31 and the signal manager 32) reads the TEID set in the received response message (step C9) and establishes the dedicated bearer between the called-end eNB 20-2 and the GW 30 (step C10). Also in this case, the reading of the TEID and the establishing of the dedicated bearer may be carried out in the reverse order or in parallel.

Then the GW 30 (the bearer manager 31 and the signal manager 32) attaches the read TEIDs (of the calling end and the called end) to a PCC decision proposition ACK message that notify the IMS server 50 of the completion of bearer establishment and sends the message to the IMS server 50 (step C11). The notification of the calling-end TEID and the called-end TEID to the IMS server 50 may be carried out separately as performed step S46 and step S52 of FIG. 3.

(Cases of Receiving a Packet from an External Network)

As illustrated in FIG. 19, upon (step C21) receipt of a DL packet (destined for a UE 10) from an external network, such as Internet, the GW 30 carries out termination processing on the header of the received packet in the lower layer processor 34 and then forwards the packet to the upper layer processor 33. The upper layer processor 33 analyzes the IP header of the forwarded packet to read the destination address information of the packet, and refers to the entries in the filter list 331 on the basis of the destination address information to retrieve and specifies the TEIDs of the eNB 20 that the destination UE 10 connects and the DL (step C22).

The upper layer processor 33 forwards the received packet and the specified information to the lower layer processor 34, which creates a GTP header including the specified information, attaches the created GTP header to the received packet, and sends the packet to the tunnel route recognized by the TEID of the DL (step C23).

Namely, the upper layer processor 33 and the lower layer processor 34 convert (encapsulate) a packet received from an external network into a suitable format for forwarding the packet to the eNB 20 that the destination UE 10 connects, and send the converted packet to the eNB 20.

(Cases of Receiving, from the eNB, a Packet that is to be Sent to an External Network)

As illustrated in FIG. 20, upon receipt of a packet destined for an external network such as Internet from the eNB 20 (step C31), the GW 30 causes the lower layer processor 34 and the upper layer processor 33 to read an IP packet that is to be transmitted to an external network (step C32) through extracting header not required for sending the packet to the external network and the like, and send the read IP packet to the external network (step C33).

In other words, the upper layer processor 33 and the lower layer processor 34 convert a packet destined for an external network and received from the eNB 20 into a format suitable for forwarding the packet to the external unit, and then send the received packet to the external network.

(Cases of Receiving a Tunnel Packet)

As illustrated in FIG. 21, upon receipt (step C41) of a packet which the calling-end eNB 20 bypasses the header decompression processing thereon and which is forwarded through a tunnel route, the GW 30 forwards the packet from the lower data processor 34 to the upper layer processor 33, which retrieves a corresponding entry in the routing table 332 on the basis of the TEID of the DL attached to the GTP payload and consequently specifies the forwarding destination (destination) eNB 20 (the tunnel route of the DL) (step C42).

Then the upper layer processor 33 forwards the received packet (GTP payload) along with the specified information to the lower data processor 34, which attaches a header, including information (eNBID) indicating the specified tunnel route (the destination-end eNB 20) of the DL, to the received packet and sends the packet to the tunnel route (step C43).

Namely, upon receipt of a packet which the calling-end eNB 20 bypasses the header decompression processing thereon and which is forwarded, the upper layer processor 33 and the lower data processor 34 replace the header of the received packet such that the packet is forwarded to a tunnel destination identified by the TEID attached to the GTP payload of the received packet, and then send the packet.

Figure 22:
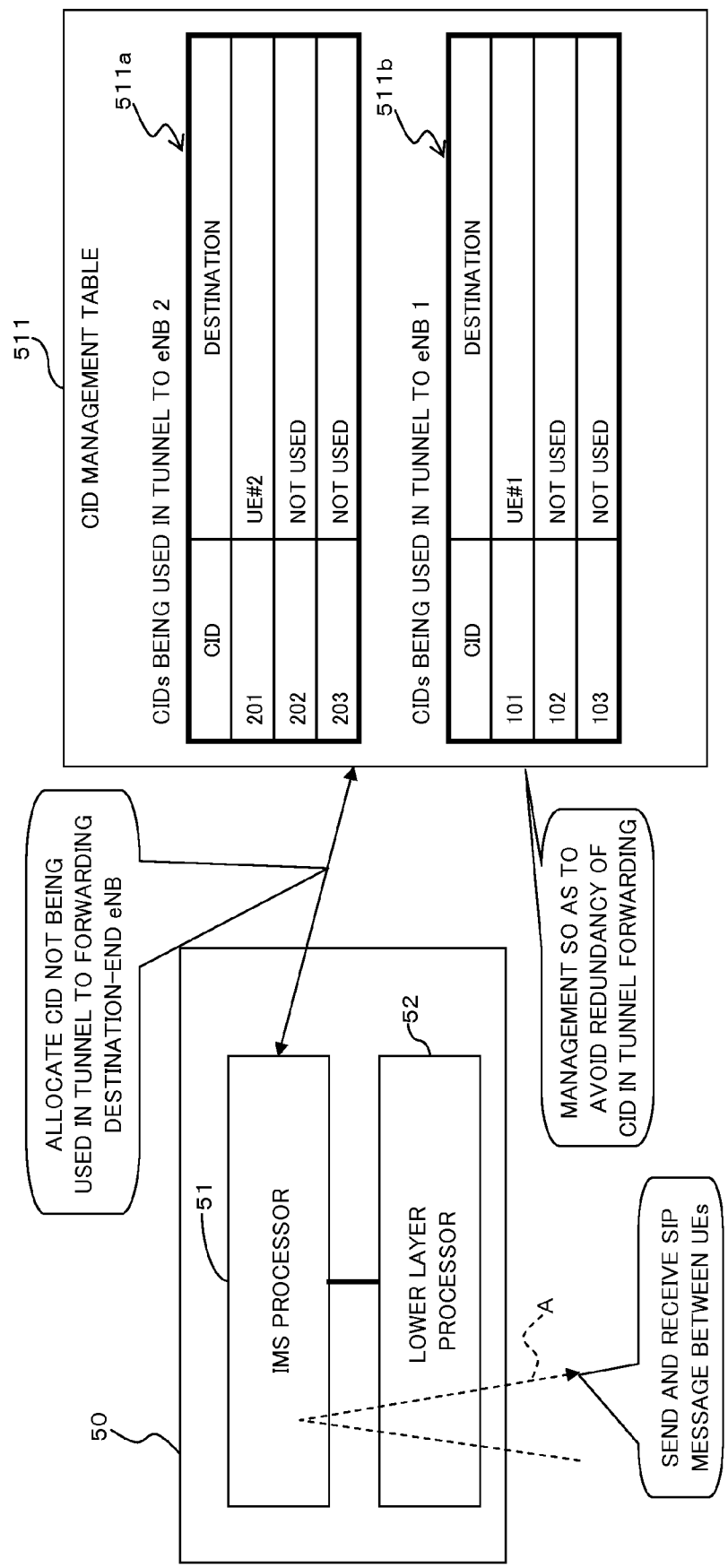
[FIG. 22] A flow diagram illustrating the configuration (function) of an IMS (IP Multimedia Subsystem) server according to the embodiment.

(3.4) Description of the IMS Server:

FIG. 22 is a block diagram illustrating the configuration of the IMS server 50. The IMS server 50 illustrated in FIG. 22 includes, for example, an IMS processor 51 and a lower layer processor 52. In FIG. 22, dotted arrow A represents a route (flow) of signal forwarding in the IMS server 50. That is, the signal flow represented by dotted arrow A indicates that SIP messages and messages as bearer establishment are sent and received via the lower layer processor 52 and the IMS processor 51.

Here, the IMS processor 51 has functions of, for example, creating SIP messages (e.g., INVITE messages) destined for a UE 10 and message (e.g., PCC decision proposition) destined for the GW 30 as the bearer establishment processing, receiving SIP message (e.g., 200 OK message) from a UE 10 and response message (e.g., PCC decision proposition ACK) from the GW 30.

The IMS processor 51 stores a CID management table 511 of FIG. 22 which corresponds to the above Table 2 in a memory not-illustrated or another device.

As represented by symbols 511a and 511b, the CID management table (Table) 511 is data to manage the state (used/not used) of using CIDs, serving as one of the examples of information which represents no requirement of header decompression processing by the calling-end eNB 20 for a packet having the same CID attached thereto, for each tunnel route (DL_TEID) to a forwarding destination-end eNB 20. The CID management table 511 is mainly formed of TEIDs and eNBIDs notified during the bearer establishment processing at step S4 of FIG. 3.

The IMS processor 51 manages CIDs representing no requirement of a header decompression processing at the calling-end eNB 20, on the basis of the CID management table 511, such that two or more CID are not allocated to an identical tunnel route and that a CID is allocated to each UE 10.

The lower layer processor 52 has a function of converting SIP messages and messages used as bearer establishment processing into messages having a format (protocol) suitable for interfacing between the GW 30 and the IMS server 50 itself.

(Description of Operation)

Hereinafter, description will now be made in relation to operation of the IMS server 50 having the above configuration with reference to FIG. 23, which is a flow diagram illustrating operation performed at the start of connection (the calling connection) in the IMS server 50.

upon receipt (step D1) of INVITE message of SIP from the calling UE 10-1 of step S1 of FIG. 8 at the IMS processor 51 through the lower layer processor 52, the IMS server 50 specifies the called UE 10-2 on the basis of the destination information included in the received INVITE message and sends the INVITE message of the SIP to the specified UE 10-2 through the lower layer processor 52 (step D2), which corresponds to the process at step S2 of FIG. 8.

After that, upon receipt (step D3) a response message (200 OK) from the calling UE 10-2 in response to the INVITE message, the IMS server 50 (IMS processor 51) creates a message (PCC decision proposition) requesting establishment of a bearer between the UE 10-1 and the GW 30 and sends the message to the GW 30 (step D4), which corresponds to a process at step S41 of FIG. 3.

As described at step S46 of FIG. 3, upon receipt of a message (PCC decision proposition ACK) responsive to the sent message, the IMS server 50 extracts the TEID of the DL from the received message (step D5).

In addition, the IMS server 50 creates a message (PCC decision proposition) requesting bearer establishment between the called UE 10-2 and the GW 30 and sends the created message to the GW 30 (step D6), which corresponds to the process at step S47 of FIG. 3.

As illustrated at step S52 of FIG. 3, upon receipt of the response message (PCC decision proposition ACK) responsive to the sent message, the IMS server 50 extracts the TEID of the DL from the received message (step D7).

The request for bearer establishment between the calling UE 10-1 and the GW 30 and that between the called UE 10-2 and the GW 30 may be carried out in parallel.

After that, the IMS server 50 (the IMS processor 51) selects CIDs that the calling UE 10-1 and the called UE 10-2 are to use for header compression of the ROHC from CIDs not being used with reference to the CID management table 511 (511a, 511b) (step D8). The IMS processor 51 changes the using state of the selected CIDs in the CID management table 511 to "being used".

The IMS server 50 (the IMS processor 51) creates an SIP message (200 OK), including the CIDs selected and the TEIDs received in step D5 and step D7, destined for the calling UE 10-1 and sends the created message (step D9), which corresponds to the process at step S6 in FIG. 8.

Namely, the IMS processor 51 of the first embodiment includes a function of a generator which creates information (CID, TEID) which is to be attached to compressed data created through header compression and sent to the called UE 10-2 by the calling UE 10-1 and which is to be used to recognize whether or not the compressed data requires the header decompression processing and recognize a forwarding route to the destination UE 10-2. The lower layer processor 52 includes a function of a notifier which notifies the created information to the calling UE 10-1 while a communication path (bearer) between the UE 10-1 and the UE 10-2 is being set.

The inclusion of the UEs 10, eNBs 20, the GW 30, and the IMS server 50 can realize the operation and the effect of item (2).

(4) Others:

The foregoing first embodiment is described, assuming that a single eNB 20 is interposed between each UE 10 and the GW 30. Alternatively, it is possible to eliminate the requirement of the header decompression processing at a calling-end eNB 20 and the header compression processing at a called-end eNB 20 of a packet having a particular CID (bypass identifier) also in a route along which two or more eNBs 20 are disposed between a UE 10 and GW 30 in the same manner as the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for communication between a first communication terminal and a second communication terminal, the method comprising:
   compressing a header of a first packet associated with data being sent to the second communication terminal by the first communication terminal, and attaching information to be used to recognize whether or not header extension processing is required and to recognize a forwarding route to the second communication terminal to a compressed first packet whose header is compressed;
   generating a second packet storing the compressed first packet by the first communication terminal, and sending the second packet to a network;
   upon receiving the second packet from the first communication terminal by a data forwarding unit that is one of the units constituting the network, extracting the compressed first packet from the second packet by terminating the second packet, and recognizing whether or not the compressed first packet requires the header extension processing and the forwarding route on the basis of the information attached to the compressed first packet; and
   sending, if the compressed first packet does not require the header extension process, the compressed first packet to the recognized forwarding route without extending the header of the first packet.

2. The method for communication according to claim 1, wherein the information includes:
   a first information piece which is context recognition information to recognize a context used for header compression of the data and which is predetermined in accordance with as to whether or not the header extension processing is required; and
   a second information piece which is predetermined recognition information to recognize the forwarding route and which is used by the data forwarding unit.

3. The method for communication according to claim 2, further comprising:
  attaching the first information piece and the second information piece, as information to be processed in a first layer to which the header extension processing belongs, to the compressed first packet by the first communication terminal when generating and sending the second packet storing the compressed first packet by the first communication terminal; and
  attaching the second information piece, as information to be processed in a second layer lower than the first layer that the header extension processing belongs, to the compressed first packet when sending the compressed first packet to the forwarding route by the first communication terminal.

4. The method for communication according to claim 3, wherein the information is notified from a controller which controls setting of a communication path between the first communication terminal and the second communication terminal.

5. The method for communication according to claim 4, wherein the controller uses a message that is to be sent and received when the communication path is set for the notification of the second information piece.

6. The method for communication according to claim 2, wherein the information is notified from a controller which controls setting of a communication path between the first communication terminal and the second communication terminal.

7. The method for communication according to claim 6, wherein the controller uses a message that is to be sent and received when the communication path is set for the notification of the second information piece.

8. The method for communication according to claim 1, wherein the information is notified from a controller which controls setting of a communication path between the first communication terminal and the second communication terminal.

9. The method for communication according to claim 8, wherein the controller uses a message that is to be sent and received when the communication path is set for the notification of the second information piece.

10. A communication terminal comprising
  an attaching unit which compresses a header of a first packet associated with data being sent to an another second communication terminal, and attaches information used to recognize whether or not header extension processing is required and to recognize a forwarding route to the second communication terminal to a compressed first packet whose header is compressed; and
  a sender which generates a second packet storing the compressed first packet, and sends the second packet having the attached information to a network.

11. A data forwarding unit comprising:
  a receiver which receives, from a first communication terminal, a second packet storing a compressed first packet to which information used to recognize whether or not header extension processing is required and to recognize a forwarding route to a second communication terminal is attached by the first communication terminal, the compressed first packet being a compressed packet whose header of a first packet associated with data being sent to the second communication terminal is compressed by the first communication terminal;
  a recognizer which extracts the compressed first packet from the second packet by terminating the second packet, and recognizes whether or not the compressed first packet requires the header extension processing and the forwarding route on the basis of the information attached to the compressed first packet; and
  a sender which sends, if the compressed first packet does not require the header extension processing, the compressed first packet to the recognized forwarding route without extending the header of the first packet.

12. A controller comprising:
  a generator which creates information which is to be attached to a compressed first packet and which is to be used to recognize whether or not the compressed first packet requires the header extension processing and recognize a forwarding route to a second communication terminal, the compressed first packet, being a compressed packet whose header of a first packet associated with data being sent to the second communication terminal is compressed by a first communication terminal, being stored in a second packet generated by the first communication terminal, and being sent to the second communication terminal from the first communication terminal; and
  a notifier which notifies the information created by the generator to the first communication terminal while a communication path for the communication is being set.

* * * * *